United States Patent
Smith et al.

(10) Patent No.: US 10,924,882 B2
(45) Date of Patent: Feb. 16, 2021

(54) CELLULAR-UBIETY IDENTIFIER

(71) Applicant: Telefonaktiebolaget LM Ericsson (publ), Stockholm (SE)

(72) Inventors: Roland Smith, Nepean (CA); Åke Busin, Sollentuna (SE); Kunpeng Qi, Shanghai (CN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 268 days.

(21) Appl. No.: 15/754,368

(22) PCT Filed: Dec. 21, 2017

(86) PCT No.: PCT/IB2017/058307
§ 371 (c)(1),
(2) Date: Feb. 22, 2018

(87) PCT Pub. No.: WO2019/106419
PCT Pub. Date: Jun. 6, 2019

(65) Prior Publication Data
US 2020/0228916 A1 Jul. 16, 2020

Related U.S. Application Data

(60) Provisional application No. 62/592,672, filed on Nov. 30, 2017.

(51) Int. Cl.
*H04W 24/00* (2009.01)
*H04W 4/021* (2018.01)
(Continued)

(52) U.S. Cl.
CPC .......... *H04W 4/021* (2013.01); *G01S 5/0036* (2013.01); *G01S 5/0252* (2013.01); *G01S 5/0284* (2013.01); *H04W 4/023* (2013.01); *H04W 24/10* (2013.01)

(58) Field of Classification Search
CPC ..... H04W 4/021; H04W 4/023; H04W 24/01; H04W 88/02; G01S 5/0036; G01S 5/0252;
(Continued)

(56) References Cited

U.S. PATENT DOCUMENTS

2004/0000995 A1* 1/2004 Deguchi ............... H04W 64/00
340/539.13
2011/0235128 A1* 9/2011 Sisco ................... H04N 1/3878
358/3.28
(Continued)

OTHER PUBLICATIONS

PCT Notification of Transmittal of the International Search Report and the Written Opinion of the International Searching Authority, or the Declaration for International application No. PCT/IB2017/058307—dated Nov. 6, 2018.
(Continued)

*Primary Examiner* — Danh C Le
(74) *Attorney, Agent, or Firm* — Baker Botts, LLP

(57) ABSTRACT

According to certain embodiments, a method by a radio node operating as a location server is provided. The method includes receiving, from a first wireless device, user input identifying a marked location and associating the marked location with a Cellular-Ubiety Identifier (ID). Measurement information is obtained for the first wireless device. The measurement information is stored in a database with the Cellular-Ubiety ID.

17 Claims, 18 Drawing Sheets

(51) Int. Cl.
*G01S 5/00* (2006.01)
*G01S 5/02* (2010.01)
*H04W 4/02* (2018.01)
*H04W 24/10* (2009.01)

(58) Field of Classification Search
CPC ............ G01S 5/0284; H04M 1/72519; H04M 1/72522
USPC ........................ 455/456.1, 456.5, 418, 550.1
See application file for complete search history.

(56) References Cited

U.S. PATENT DOCUMENTS

| | | | |
|---|---|---|---|
| 2011/0306354 A1 | 12/2011 | Ledlie et al. | |
| 2012/0170560 A1 | 7/2012 | Han et al. | |
| 2012/0275315 A1* | 11/2012 | Schlangen | H04W 24/02 370/242 |
| 2014/0213299 A1 | 7/2014 | Marti et al. | |
| 2015/0161603 A1* | 6/2015 | Fish | G06Q 30/0261 705/44 |
| 2016/0309294 A1 | 10/2016 | Li et al. | |
| 2016/0381155 A1* | 12/2016 | Pan | H04L 61/609 709/221 |
| 2017/0055186 A1* | 2/2017 | Donepudi | H04W 4/026 |
| 2017/0186068 A1* | 6/2017 | Dumouchel | G06Q 30/0633 |
| 2017/0311217 A1* | 10/2017 | Jung | H04W 36/04 |
| 2018/0232323 A1* | 8/2018 | Ghosh | G06F 13/4068 |
| 2019/0037419 A1* | 1/2019 | Knaappila | H04W 52/0229 |
| 2019/0095658 A1* | 3/2019 | Belt | G06K 1/125 |
| 2019/0251818 A1* | 8/2019 | Nagatomi | G08G 1/20 |

OTHER PUBLICATIONS

PCT Written Opinion of the International Preliminary Examining Authority issued for International application No. PCT/IB2017/058307—dated Nov. 4, 2019.
PCT Notification of Transmittal of the International Preliminary Report on Patentability issued for International application No. PCT/IB2017/058307—dated Mar. 3, 2020.
PCT Invitation to Pay Additional Fees and, Where Applicable, Protest Fee issued for International application No. PCT/IB2017/058307—dated Jul. 18, 2018.
"Database Correlation Method for Multi-System Positioning" by Paul Kemppi and Sami Nousiainen, VTT Information Technology—2006 IEEE.
"Low-Dimensional Signal-Strength Fingerprint-Based Positioning in Wireless LANs" by Dimitris Milioris et al., Department of Computer Science, University of Crete; Article History: Received Jun. 3, 2011, Received in revised form Nov. 2, 2011, Accepted Dec. 6, 2011-Dec. 6, 2011.
"Performance Evaluation of MDT Assisted Lte RF Fingerprint Framework" by Riaz Mondel et al.; 2014 Seventh International Conference on Mobile Computing and Ubiquitous Networking (ICMU)—2014.

* cited by examiner

CELLULAR-UBIETY IDENTIFIER

PRIORITY

This nonprovisional application is a U.S. National Stage Filing under 35 U.S.C. § 371 of International Patent Application Serial No. PCT/IB2017/058307 filed Dec. 21, 2017, and entitled "Cellular-Ubeity Identifier" which claims priority to U.S. Provisional Patent Application No. 62/592,672 filed Nov. 30, 2017, both of which are hereby incorporated by reference in their entirety.

TECHNICAL FIELD

Certain embodiments of the present disclosure relate, in general, to wireless communications and more particularly to a Cellular-Ubiety identifier.

BACKGROUND

Outdoor locationing technologies have penetrated virtually all aspects of our life, from aeronautical, naval, and vehicular tracking, to retail advertisement, vehicle insurance, fleet tracking, and public transport tracking. Recently, augmented reality games embedding outdoor locationing technologies into smart phone applications, have improved people's health by forcing them to "get outdoors."

Geographical coordinate systems are well used to enable every location on earth to be specified by a set of numbers, letters or symbols. These coordinate systems provide a set of three numbers, often representing horizontal and vertical position. Most commonly known is the Global Positioning System (GPS) coordinate system, which provides a mapping of positional information to longitude, latitude, and elevation. In general, outdoor deployments use GPS or other global positioning systems to provide outdoor locationing.

With the advent of advanced GPS, one would naturally use GPS or another such known international coordinate system to capture the local of the definite place. GPS positional systems are indeed global, covering the 95% of earth with 24 active satellites, and used internationally by flight, naval, and automotive navigation systems. However, these signals are low power and have limitations on positional accuracy and operation in indoor venues since the GPS signals are often unable to penetrate buildings. Therefore, GPS is not ubiquitous. Covering 95% of the earth is not the same as covering 95% of the population where people spend their time.

Vertical markets are ripe for indoor locationing solutions that provide high accuracy, ubiquitous coverage. Prominent areas include retail, manufacturing, advertising, gaming, intelligence, public safety, asset tracking, and many, many more. The list is endless.

However, while outdoor locationing technology has, with the aid of GPS, reached a state of relative maturity, indoor locationing technology is still struggling to find a clear winning solution for global application since there is no global reference system for indoor deployments and, as stated above, GPS signals often do not penetrate buildings and, therefore, cannot be used.

Many locationing technologies exist for indoors, from Apple iBeacons, and Android Beacons, to WiFi, and even LED based technologies. However, indoor positioning technology, which is still very much in its infancy, is fragmented and in a state of disarray. There are no known solutions that couple Cellular-Ubiety positions that is positions which exist in a state of 'whereness'—to identify them for a myriad of indoor indeterminate applications.

For example, beacon technologies such as iBeacons have recently been introduced. Beacons are short range transmitters that emit identifiable BlueTooth signals, which can be recovered by smart phones, and relayed to identify the relative proximity location data to the Internet. However, since Beacons require physical transmitters to be installed, UE locations are limited to installed devices. Thus, while these systems have the benefit of being 'relative' locators, these systems require transmitters, and locate only those transmitters. As such, rather than providing a sense of 'whereness,' beacon technologies provide a sense of 'thereness' and are not ubiquitous.

As another example, WiFi technology, which is well deployed in buildings, has developed locationing solutions. These solutions however, do not present globally accepted interfaces, and tend to be application specific.

Cellular or Mobile Networks, are pervasive and available in most populated areas of the world. Because of their higher power levels, outdoor networks penetrate most smaller buildings. Indoor mobile networks also exist in many of the larger public venues such as malls, or transportation hubs. However, these systems too do not provide mass locationing capabilities that meet the demands of our evolving application space.

Thus, all of the existing technologies have the same set of problems. None are ubiquitous, none work with all smart phones, and none provide a globally accepted reference system. Systems that rely on locationing software, such as WiFi or Pico base stations, require precise locations of transmitters to be defined. These precise locations require a reference such as GPS, or in the absence of GPS, building architectural plans.

None of these technologies effectively address global indoor positioning. As such, a better solution is required.

SUMMARY

Certain aspects of the present disclosure and their embodiments may provide solutions to these or other challenges. Specifically, methods and systems are described for achieving user equipment (UE) positioning, using Cellular-Ubiety identifiers (IDs), which compare high-precision real-time N-dimensional relative Time of Arrival (ToA), Timing Difference of Arrival (TDOA), and Reference Signal Receive Power (RSRP) measurements from multiple cellular transceiver antennas, against installer and/or customer defined Cellular-Ubiety locations, each of which is a dispatchable location and is tagged with a high-precision N-dimensional relative ToA marker. In particular embodiments, installers and/or customers may use a downloadable application, to mark important Cellular-Ubiety Identifier locations, and how the cellular network calculates and maps UE positional data to customer defined Cellular-Ubiety IDs with high precision.

According to certain embodiments, a method by a radio node operating as a location server is provided. The method includes receiving, from a first wireless device, user input identifying a marked location and associating the marked location with a Cellular-Ubiety Identifier (ID). Measurement information is obtained for the first wireless device. The measurement information is stored in a database with the Cellular-Ubiety ID.

According to certain embodiments, a radio node operating as a location server is provided. The radio node includes memory storing instructions and processing circuitry operable to execute the instructions to cause the radio node to receive, from a first wireless device, user input identifying a marked location and associate the marked location with a Cellular-Ubiety Identifier (ID). Measurement information is obtained for the first wireless device. The measurement information is stored in a database with the Cellular-Ubiety ID.

According to certain embodiments, a method by a wireless device includes transmitting, to a location server, user input identifying a marked location. A request for measurement information is received and the measurement information is transmitted. A message is received from the location server that includes an indication that an association of the marked location with a Cellular-Ubiety Identifier (ID) has been stored by the location server.

According to certain embodiments, a wireless device includes memory storing instructions and processing circuitry operable to execute the instructions to cause the wireless device to transmit, to a location server, user input identifying a marked location. A request for measurement information is received and the measurement information is transmitted. A message is received from the location server that includes an indication that an association of the marked location with a Cellular-Ubiety Identifier (ID) has been stored by the location server.

Certain embodiments may provide one or more of the following technical advantages. As an example, an advantage of certain embodiments may provide high accuracy measurements, typically to an accuracy of a few meters, and often better depending on the deployment scenarios. Still another advantage may include empowering the service provider, by providing a viable solution for indoor positioning. Likewise, an advantage may be that end-customers are empowered with a tool and means to mark locations of importance.

Another advantage may be that certain embodiments define how Cellular-Ubiety IDs mapping ToA, TDOA, and RSRP measurements are translated into system wide KPIs which have high customer value, and provide "big data" opportunities.

Yet another advantage may be that service providers are enabled with information about important customer locations. In doing so, service providers can more accurately valuate the locations based services data.

Still another advantage may be that certain embodiments enable Cellular-Ubiety ID specific Key Performance Index (KPI) that relate directly to customer value. For example, KPIs can relate directly to the time spent in or near the Cellular-Ubiety Identifier location. Other KPIs can indicate the relative velocity when inside and outside of the Cellular-Ubiety Identifier location. This information may indicate if a UE user stopped at the Cellular-Ubiety Identifier location.

Yet another advantage may that certain embodiments are inexpensive by not overburdening installers with onerous measurement requirements. This has been seemingly impossible to meet indoors where GPS is not available.

Still another advantage may be that certain embodiments are resistant to installer errors, by not relying on high precision absolute DOT locations.

Yet another advantage may be that certain embodiments enable new, innovative UE position based technologies, such as augmented realities, to utilize these high accuracy positioning measurements.

Still another advantage may be that certain embodiments mitigate the effects of cable aging, by not requiring absolute measurements. Customers are empowered to update their measurements, if they change over time due to aging.

Yet another advantage may be that certain embodiments allow customers to define Cellular-Ubiety Identifier locations that are outside of their venue, for example, they may select a location at the entrance of a mall, to know when a UE is entering the mall.

Still another advantage may be that certain embodiments eliminate the issues of vandalism, which are experienced with BlueTooth devices. Certain embodiments may also eliminate battery issues.

Certain embodiments may include none, some, or all of these advantages. Certain embodiments may include other advantages, as would be understood by a person having ordinary skill in the art.

DETAILED DESCRIPTION

Figure 1:
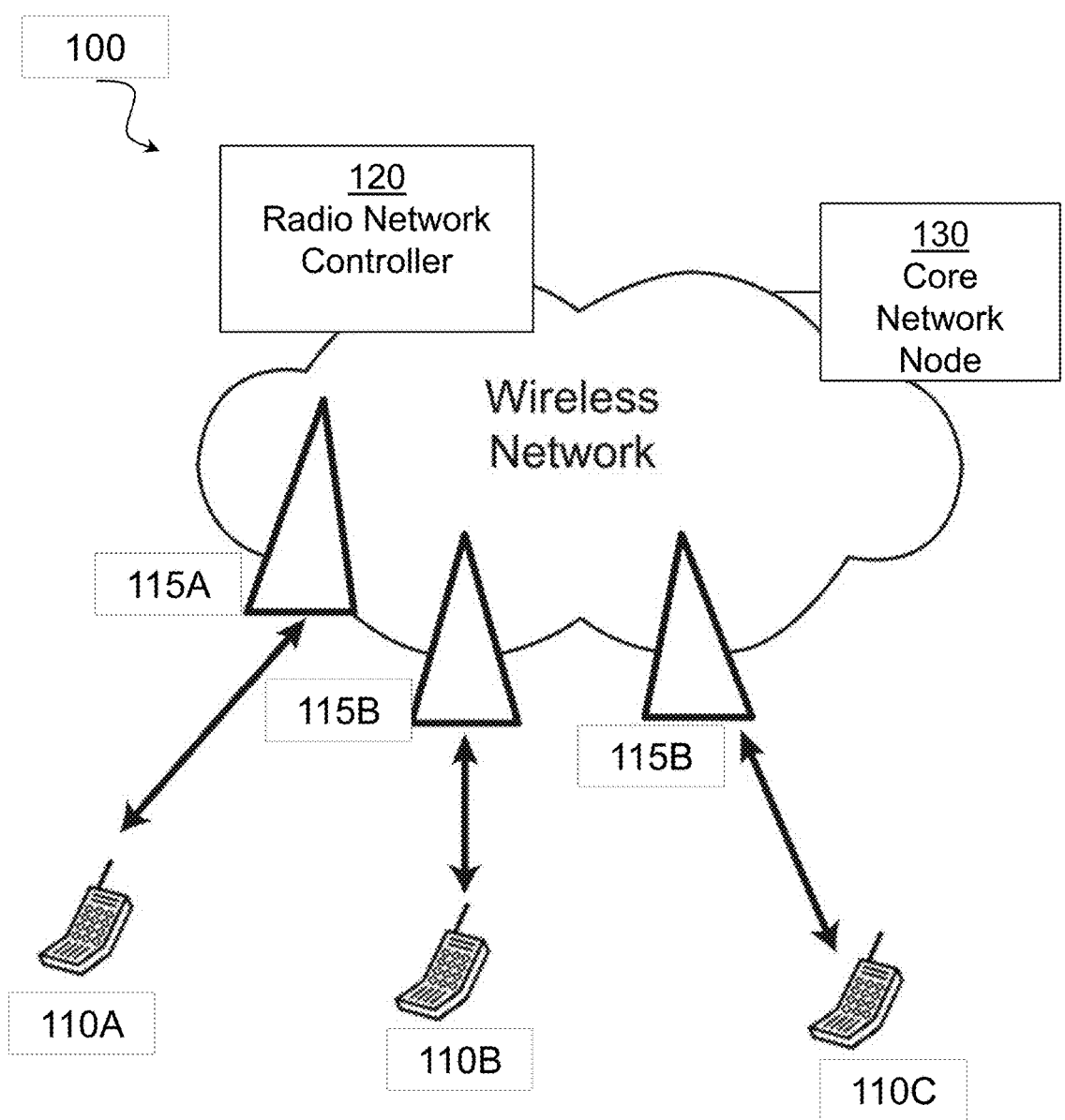
FIG. 1 illustrates an embodiment of a network for locationing, in accordance with certain embodiments.

Certain embodiments may include functionality for locationing. According to certain embodiments, for example, a Cellular-Ubiety Identifier (ID) is proposed to identify positional locations defined by wireless networks.

Ubiety is defined as the condition of being in a definite place. Ubiety captures the sense of 'whereness' of a place, allowing locations to be defined without the constraints of installed beacons, or accurately located reference sources such as WiFi APs or Pico radio transmitters. According to certain embodiments, techniques are described herein for connecting this sense of 'whereness' with an identifier, allowing customers to define positions, without installing hardware, but by merely using their mobile phone to mark a location.

According to certain embodiments, the problem of user equipment (UE) Position tracking is tackled by introducing a paradigm change. As a result, low precision absolute (x, y, z) measurements, which suffer from cumulative errors such as incorrect radio location data entered by installers, are replaced with high precision relative measurements, which do not require radio transmitter locational information.

According to certain embodiments, the eNB reporting paradigm is changed from Cell Portion data, which links UE location to a single antenna coverage area, to a Cellular-Ubiety ID, which is used to identify a location as a correlated set of time and spatial signal signatures for a customer defined location of 'whereness.'

The following three key innovative elements may be provided by some or all of the embodiments disclosed herein:
1. Certain methods and systems may use the mobile network to make relative UE (user equipment) Cellular-Ubiety measurements which include one or more of: ToA (Time of Arrival), TDOA (Differential ToA); and RSRP (Reference Signal Received Power). UE Cellular-Ubiety measurements may be relative to fixed mobile network radio transceivers. A UE application is used to trigger the Cellular-Ubiety measurement procedure, and to assign the set of measurements to an ID, called a Cellular-Ubiety Identifier.
2. Certain methods and systems may use the mobile network to continually track these relative measurements from other UE's on the network, comparing UE measurements against Cellular-Ubiety data. When a UE location matches a Cellular-Ubiety location, to within a specified distance, a notification process occurs.
3. Certain methods and systems send the UE ID with the Cellular-Ubiety Identifier in the notification process. The Cellular-Ubiety Identifier defines the customer Ubiety location, and the UE ID defines the specific UE which is located at or near to the Cellular-Ubiety Identifier.

What is unique about the methods, systems, and techniques described herein may be that they do not require an absolute reference solution, such as GPS. Rather, they rely on high precision relative measurements to map against customer defined Cellular-Ubiety measurements. According to certain embodiments, these relative measurements may be mapped to IDs for universal identification within the context of a global network.

According to certain embodiments, end-customers may be empowered with the ability to define as many Cellular-Ubiety IDs as considered necessary for their application. For example, a customer may be allowed to define Cellular-Ubiety Identifier points for all locations where they would have installed BlueTooth Beacons. In other embodiments, customers may request streaming Cellular-Ubiety data for a physical area such as a warehouse where the customers have marked multiple locations using a smart phone application, and are relying on the Cellular-Ubiety Identifier data to more precisely locate devices within the warehouse or other area.

Certain critical differences exist between low precision absolute (x, y, z) positional measurements and high precision relative measurements. Normal UE positioning systems follow standard locational methodologies to determine UE positional measurements, and map them into a (x, y, z) positional coordinate system. To perform this mapping, installers must precisely know two key parameters:
1. The absolute (x, y, z) position of the mobile cellular transmitter antennas,
2. The absolute time delay of the mobile cellular transmitter antennas with respect to each other.

For outdoor networks, the first parameter is difficult, but not impossible to measure. Installers use GPS to accurately determine the location of the antennas, so that they can be located to within a few meters of accuracy, and this data is populated into cellular system managed objects (MOs). For indoor systems, there is no GPS signal; therefore, installers must use building architectural drawings to accurately determine the location of the antennas. While it is possible to find the occasional diligent installer, who can read architectural drawings, and accurately map the antenna locations to a GPS (x, y, z) coordinate system, the clear majority of installers will introduce significant errors, making these absolute positional data highly inaccurate.

The second parameter is also difficult to measure. For one, it requires cable delay measurements to be made to nanosecond accuracy, which is not a trivial task. Secondly, there is no means for field installers to accurately measure other key parameters such as SAW or BAW filter delays, or cable delay variations with temperature, or even aging of a cable which causes dielectric constants to change, and therefore impacts the time delays.

However, certain embodiments described herein empower the end customer to define and mark "whereness" points—that it locations of interest or importance. As described above, Ubiety is the state of existing in a specific point in space, thereness. Cellular-Ubiety IDs mark those points, which do not have meaning as absolute (x, y, z) locations, but none the less, they have they meaning . . . a sense of thereness.

It is important also to make an important point. Specifically, even if trilateration GPS coordinate based UE positioning could be made to be 100% accurate, so that the absolute (x, y, z) locations of the radio transmitters were known, and the absolute time delay of the mobile cellular transmitter antennas with respect to each other were also known to nanosecond accuracy, so that the network solution could precisely inform the customer of the location of each UE, the data would be of little use to end-customers.

Why? Because there is no GPS indoors. Customers cannot use their smart phones to find a specific (x, y, z) location. Of course, customers could read architectural building plans and employ laser measurement tools from Home Depot to find locations, or they could hire a consulting company to do this work, but neither of these solutions is viable for a mainstream delivery of UE positioning.

By contrast, Cellular-Ubiety IDs present a viable and readily deployable solution. Specifically, customers may define locations of interest in a more easily done manner than installing BlueTooth beacons. Thereafter, the Cellular-Ubiety ID software may inform customers (or more precisely, their application services) when any other UE's come within predefined ranges of these locations, enabling more advanced location based services to be sold.

Particular embodiments are described in FIGS. 1-20 of the drawings, like numerals being used for like and corresponding parts of the various drawings. FIG. 1 is a block diagram illustrating an embodiment of a network 100 for locationing, in accordance with certain embodiments. Network 100 includes one or more wireless devices 110A-C, which may be interchangeably referred to as wireless devices 110 or UEs 110, and network nodes 115A-C, which may be interchangeably referred to as network nodes 115 or eNodeBs 115, radio network controller 120, and a core network node 130. A wireless device 110 may communicate with network nodes 115 over a wireless interface. For example, wireless device 110A may transmit wireless signals to one or more of network nodes 115, and/or receive wireless signals from one or more of network nodes 115. The wireless signals may contain voice traffic, data traffic, control signals, and/or any other suitable information. In some embodiments, an area of wireless signal coverage associated with a network node 115 may be referred to as a cell. In some embodiments, wireless devices 110 may have D2D capability. Thus, wireless devices 110 may be able to receive signals from and/or transmit signals directly to another wireless device 110. For example, wireless device 110A may be able to receive signals from and/or transmit signals to wireless device 110B.

In certain embodiments, network nodes 115 may interface with a radio network controller 120. Radio network controller 120 may control network nodes 115 and may provide certain radio resource management functions, mobility management functions, and/or other suitable functions. In certain embodiments, radio network controller 120 may interface with core network node 130 via an interconnecting network 125. The interconnecting network 125 may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

Core network node 130 may manage the establishment of communication sessions and provide various other functionality for wireless communication device 110. Wireless communication device 110 exchanges certain signals with core network node 130 using the non-access stratum layer. In non-access stratum (NAS) signaling, signals between wireless communication device 110 and core network node 130 pass transparently through network nodes 120. According to certain embodiments described below, core network node 130 may include or operate as a location server and exchange signaling with wireless devices 110 and network nodes 115 to provide locationing services to wireless devices 110 and LCS clients.

As described above, example embodiments of network 100 may include one or more wireless devices 110, and one or more different types of network nodes capable of communicating (directly or indirectly) with wireless devices 110. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, a modem, a machine-type-communication (MTC) device/machine-to-machine (M2M) device, laptop embedded equipment (LEE), laptop mounted equipment (LME), USB dongles, a D2D capable device, or another device that can provide wireless communication. A wireless device 110 may also be referred to as UE, a station (STA), a device, or a terminal in some embodiments. Also, in some embodiments, generic terminology, "radio network node" (or simply "network node") is used. It can be any kind of network node, which may comprise a Node B, base station (BS), multi-standard radio (MSR) radio node such as MSR BS, eNode B, network controller, radio network controller (RNC), base station controller (BSC), relay donor node controlling relay, base transceiver station (BTS), access point (AP), transmission points, transmission nodes, RRU, RRH, nodes in distributed antenna system (DAS), core network node (e.g. MSC, MME etc.), O&M, OSS, SON, positioning node (e.g. E-SMLC), MDT, or any suitable network node. Each of wireless communication device 110, network node 115, radio network controller 120, and core network node 130 include any suitable combination of hardware and/or software. Example embodiments of wireless devices 110, network nodes 115, and other network nodes (such as radio network controller or core network node) are described in more detail with respect to FIGS. 2, 3, and 14, respectively.

Although FIG. 1 illustrates a particular arrangement of network 100, the present disclosure contemplates that the various embodiments described herein may be applied to a variety of networks having any suitable configuration. For example, network 100 may include any suitable number of wireless devices 110 and network nodes 115, as well as any additional elements suitable to support communication between wireless devices or between a wireless device and another communication device (such as a landline telephone). In certain embodiments, wireless communication device 110, network node 120, and core network node 130 use any suitable radio access technology, such as long term evolution (LTE), LTE-Advanced, NR, UMTS, HSPA, GSM, cdm12000, WiMax, WiFi, another suitable radio access technology, or any suitable combination of one or more radio access technologies. For purposes of example, various embodiments may be described within the context of certain radio access technologies. However, the scope of the disclosure is not limited to the examples and other embodiments could use different radio access technologies.

Figure 2:
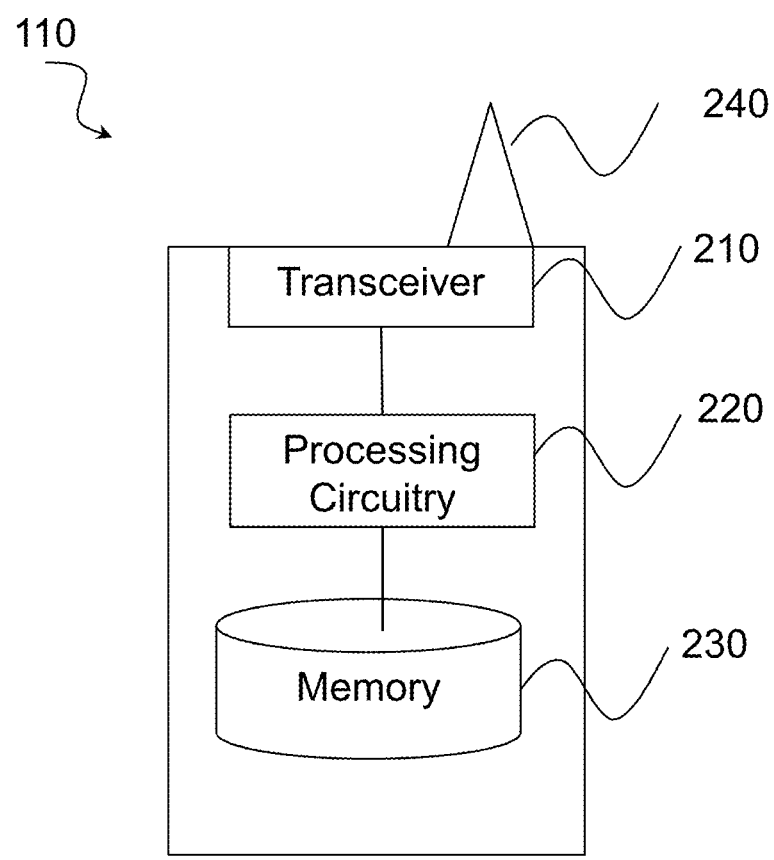
FIG. 2 illustrates an exemplary wireless device for locationing, in accordance with certain embodiments.

FIG. 2 is a block schematic of an exemplary wireless device 110 for locationing, in accordance with certain embodiments. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, a modem, an MTC device/machine-to-machine (M2M) device, laptop embedded equipment (LEE), laptop mounted equipment (LME), USB dongles, a D2D capable device, or another device that can provide wireless communication. A wireless device 110 may also be referred to as UE, a station (STA), a device, or a terminal in some embodiments. Wireless device 110 includes transceiver 210, processing circuitry 220, and memory 230. In some embodiments, transceiver 210 facilitates transmitting wireless signals to and receiving wireless signals from network node 115 (e.g., via antenna 240), processing circuitry 220 (e.g., which may include one or more processors) executes instructions to provide some or all of the functionality described above as being provided by wireless device 110, and memory 230 stores the instructions executed by processing circuitry 220.

Processing circuitry 220 may include any suitable combination of hardware and software implemented in one or more modules to execute instructions and manipulate data to perform some or all of the described functions of wireless device 110, such as the functions of UE 110 (i.e., wireless device 110) described below. For example, in certain embodiments, processing circuitry 220 may include instructions that when executed cause wireless device to transmit a request for location information during a position determining phase, receive, a request for current measurement information, transmit the current measurement information, and receive a response that comprises the location information indicating a current location of the wireless device relative to a marked associated with a Cellular-Ubiety Identifier (ID) associated with previously obtained measurement information.

In some embodiments, processing circuitry 220 may include, for example, one or more computers, one or more central processing units (CPUs), one or more microprocessors, one or more applications, one or more application specific integrated circuits (ASICs), one or more field programmable gate arrays (FPGAs) and/or other logic.

Memory 230 is generally operable to store instructions, such as a computer program, software, an application including one or more of logic, rules, algorithms, code, tables, etc. and/or other instructions capable of being executed by a processor. Examples of memory 230 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by processor 220.

Other embodiments of wireless device 110 may optionally include additional components beyond those shown in FIG. 2 that may be responsible for providing certain aspects of the wireless device's functionality, including any of the functionality described above and/or any additional functionality (including any functionality necessary to support the solution described above). As just one example, wireless device 110 may include input devices and circuits, output devices, and one or more synchronization units or circuits, which may be part of the processing circuitry 220. Input devices include mechanisms for entry of data into wireless device 110. For example, input devices may include input mechanisms, such as a microphone, input elements, a display, etc. Output devices may include mechanisms for outputting data in audio, video, and/or hard copy format. For example, output devices may include a speaker, a display, etc.

Figure 3:
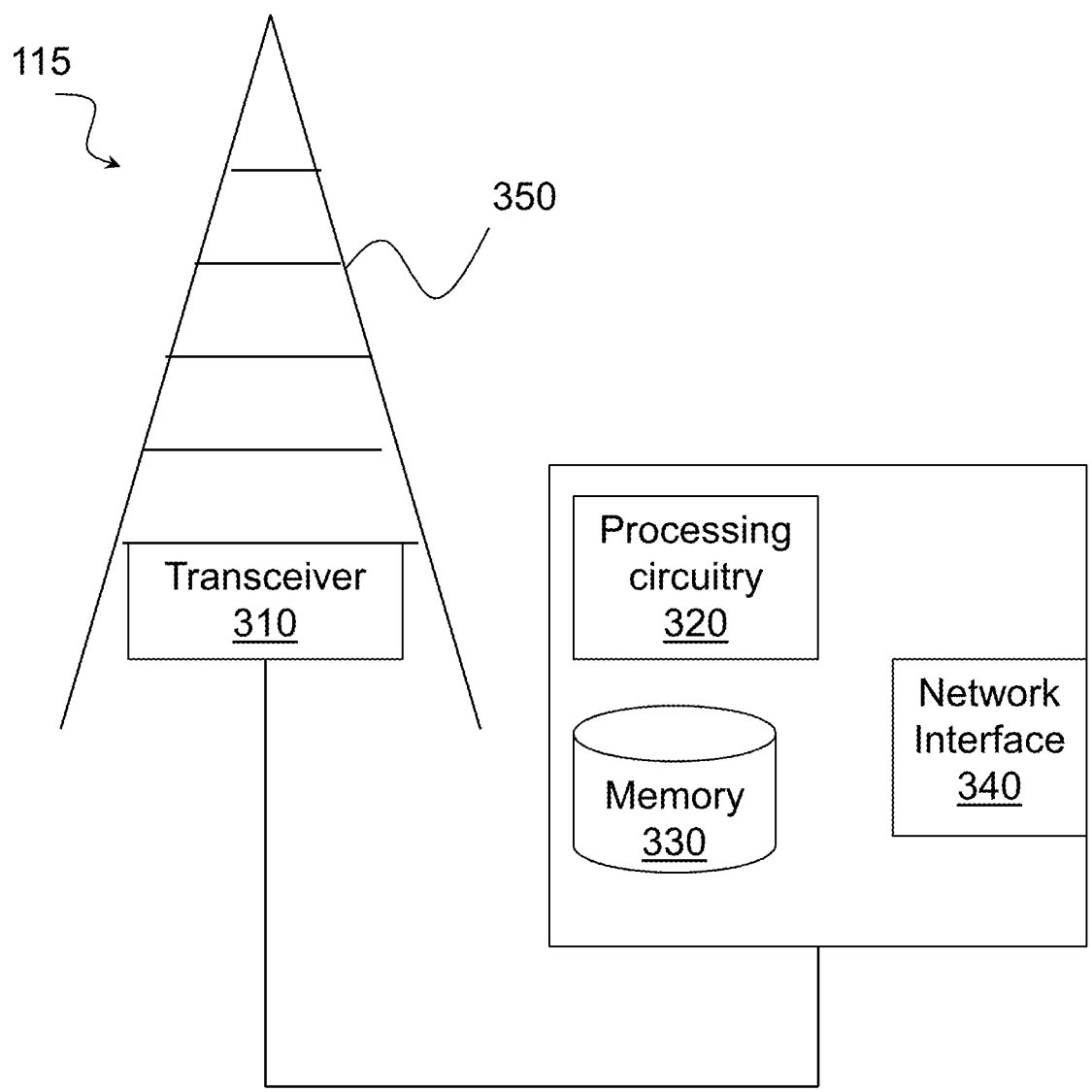
FIG. 3 illustrates an example network node for locationing, in accordance with certain embodiments.

FIG. 3 illustrates an example network node 115 for locationing, in accordance with certain embodiments. Network node 115 may be any type of radio network node or any network node that communicates with a UE and/or with another network node. Examples of network node 115 include an gNB, eNodeB, a node B, a base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, nodes in distributed antenna system (DAS), O&M, OSS, SON, positioning node (e.g., E-SMLC), MDT, or any other suitable network node. Network nodes 115 may be deployed throughout network 100 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 310, processing circuitry 320 (e.g., which may include one or more processors), memory 330, and network interface 340. In some embodiments, transceiver 310 facilitates transmitting wireless signals to and receiving wireless signals from wireless device 110 (e.g., via antenna 350), processing circuitry 320 executes instructions to provide some or all of the functionality described above as being provided by a network node 115, memory 330 stores the instructions executed by processing circuitry 320, and network interface 340 communicates signals to backend network components, such as a gateway, switch, router, Internet, Public Switched Telephone Network (PSTN), core network nodes or radio network controllers, etc.

Processing circuitry 320 may include any suitable combination of hardware and software implemented in one or more modules to execute instructions and manipulate data to perform some or all of the described functions of network node 115, such as those described below. For example, according to certain embodiments, processing circuitry 320 may include instructions that when executed cause the network node to obtain, during a position determining phase, current measurement information for a wireless device, perform a comparison of the current measurement information for the wireless device to previously obtained measurement information, and based on the comparison of the current measurement information to the previously obtained measurement information determine a location of the wireless device relative to a marked location associated with a Cellular-Ubiety Identifier (ID) associated with the previously obtained measurement information. In some embodiments, processing circuitry 320 may include, for example, one or more computers, one or more central processing units (CPUs), one or more microprocessors, one or more applications, and/or other logic.

Memory 330 is generally operable to store instructions, such as a computer program, software, an application including one or more of logic, rules, algorithms, code, tables, etc. and/or other instructions capable of being executed by a processor. Examples of memory 330 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 340 is communicatively coupled to processing circuitry 320 and may refer to any suitable device operable to receive input for network node 115, send output from network node 115, perform suitable processing of the input or output or both, communicate to other devices, or any combination of the preceding. Network interface 340 may include appropriate hardware (e.g., port, modem, network interface card, etc.) and software, including protocol conversion and data processing capabilities, to communicate through a network.

Other embodiments of network node 115 may include additional components beyond those shown in FIG. 3 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

UE Positioning is a topic which has been around for many years, and is now increasingly important for many applications such as Location Based Services, building security, improved logistics for first responders, and autonomous robotic maintenance services (ARMS). The ability to locate a UE position to within meters, or even centimeters has the potential for great value. Accordingly, as described herein, wireless device 110 and network node 115 may cooperate with wireless network 100 to provide indoor UE positioning. Specifically, wireless network 100 may make high precision Time of Arrival (ToA) measurements, which may be used to estimate Differential Time of Arrival (TDOA). RSRP measurements may also be made.

According to certain embodiments, for example, network node 115 may continuously measure Timing Advance (TA) error, as the deviation from the preferred arrival time of symbols from the different wireless devices 110. TA measurements are required to preserve orthogonality between wireless devices 110 and prevent inter-symbol and inter-carrier interference. At the end of each transmitted symbol, there is a simultaneous change of phase and amplitude in all subcarriers. To mitigate the impact of this transient, LTE systems measure the UE UL symbol ToA, and instruct each wireless device 110 to move the transmitted symbol in time, by ±16 Ts, or 0.52 µs.

Generally, ToA is measured by analyzing the channel estimate, and calculating a center of gravity of the squared magnitude of the channel impulse response. Wireless device 110 is then instructed to change its timing to move the center of gravity of the power delay profile to a predetermined position.

TDOA follows by selecting one of the antennas of network node 115 as a reference. Typically, the signal with the highest UL RSRP or lowest PL is selected as the reference antenna. All other network node antenna ToA values are then subtracted from this reference ToA value.

For the performance of locationing using ToA measurements a network node 115, which may include a base station (BS), is connected to a distributed antenna system (DAS). The DAS consists of several antennas connected to the BS. The connections can be of different types such as coax cable, twinned pair cable or fiber. Connection can have different structures such as, for example, a star formed with individual connections Antennas to BS, ring formed with a common connection. Connections can also be hierarchically structured with distribution and aggregation nodes. The signal carried can be analog or digital.

Associated with each antenna there is a Control Circuit (CC) that momentarily can mute the received signal such it is not forwarded to the network node 115. The CC in each antenna is individually steered by the Rx function in the network node 115. The CC does not necessary reside in the antenna. The network node 115 consists of a transmit (Tx) function and a receive (Rx) function. The Tx function sends a repetitive signal structure such as Frames or Slots or Symbols, and informs the Rx function of the timing of the signal structure. The Rx function can measure the arrival time of instances of the signal structure and will steer the CCs in the antennas such that the received signal structure during the measurement is only received from one antenna at a given time.

Network node 115 may transmit signal structure to the wireless device 110 in the form of frames (or slots, or symbols, or any structured element). Wireless device 110 in turn transmits frames that are time aligned with the frames sent from network node 115 but with a delay that depends on:

1. Delay for signal to travel from Tx function in network node 115 to the wireless device 110 mainly consisting of delays in cables and delay due to travel over that air from antenna to wireless device 110.

2. Time alignment errors in wireless device

The Rx function utilizes the CC in the antennas to measure the time difference from sending a frame from Tx function to receiving the corresponding frame at the Rx function via one of the antennas at a time. This measurement is repeated for each antenna at different time instances such as, for example, different frames.

The measured time delay can be expressed as:

$$BS_M[Rx-x]_N = [UE\ Tx_N - BS\ Tx_N] + CD_M + D_M/c$$

where:

M=Antenna M

N=Frame N $CD_M$=Delay in cable from antenna M to BS Rx $D_M$=Distance from antenna M to UE c=Speed of light (use as approximation of speed of radio waves)

For LTE, the timing of UE $Tx_N$ is synchronized to BS $Tx_N$ with an offset that depends on:

The delay in antenna system from Tx function to antenna

The delay over the air from antenna to the UE

The time alignment mechanism in the UE

For a stationary wireless device 110, and over a limited time period, the offset can be considered fixed and UE $Tx_N$–BS $Tx_N$ may therefore be considered constant over limited range of N. The measured time delay can then be expressed as:

$$BS_M[Rx-x]_N = CTO + CD_M + D_M/c$$

where CTO=Constant Time Offset.

In a two-dimensional system, $D_M$ can be expressed as:

$$D_M = [(X-X_M)^2 + (Y-Y_M)^2]^{1/2}/c$$

where:
X and Y are coordinates of the UE location
$X_M$ and $Y_M$ are coordinates of antenna M location For measurement from M antennas, an equation system can then be defined as:

$$BS_1[Rx - Tx]_N - CD_1 - [(X - X_1)^2 + (Y - Y_1)^2]^{1/2}/c = CTO$$

$$BS_2[Rx - Tx]_N - CD_2 - [(X - X_2)^2 + (Y - Y_2)^2]^{1/2}/c = CTO$$

$$\ldots$$

$$BS_M[Rx - RTx]_N - CD_M - [(X - X_M)^2 + (Y - Y_M)^2]^{1/2}/c = CTO$$

If $X_M$, $Y_M$ and $CD_M$ are known, and M>2, then the system can in normal cases be solved, and the UE location determined. Where not all used antennas are placed on a straight line, to give reasonable positioning accuracy, wireless device 110 needs to be at a location where the used antennas are in different directions from wireless device 110. As the system is non-linear and measurements and delay estimate have error, an iterative solution method is normally needed.

To illustrate the concept, a one-dimensional simplification where two antennas are placed on the X-axis and the UE is located between the antennas is described. The equation is then simplified to:

$$D_M = |(X-X_M)|/c$$

Further simplifying we assume $X_1=0$ and $X_2$ is positive. Then:

$$BS_1[Rx-Tx]_N - CD_1 - X/c = CTO$$

$$BS_2[Rx-Tx]_N - CD_2 - (-(X-X_2))/c = CTO$$

This can be solved with algebraic method as below:

$$BS_2[Rx - Tx]_N - CD_2 + (X - X_2)/c = BS_1[Rx - Tx]_N - CD_1 - X/c$$

$$\Rightarrow$$

$$(X - X_2)/c + X/c = BS_1[Rx - Tx]_N - BS_2[Rx - Tx]_N + CD_2 - CD_1$$

$$\Rightarrow$$

$$2X - X_2 = c(BS_1[Rx - Tx]_N - BS_2[Rx - Tx]_N + CD_2 - CD_1)$$

$$\Rightarrow$$

$$X = (c(BS_1[Rx - Tx]_N - CD_1 - BS_2[Rx - Tx]_N + CD_2) + X_2)/2$$

For outdoor environments where network node antennas may be hundreds of meters to kilometers apart, and possibly timed from different clock sources, and where channel reflections are often significant, the measured ToA values typically have large errors on the order of many hundreds of nanoseconds.

For indoor environments, where network node antennas are typically tens of meters apart, and often timed from the same source, and where channel reflections are often small, with delay spreads limited to tens of nanoseconds, and possibly up to 100 nanoseconds, the measured ToA values typically have very small errors on the order of tens of nanoseconds.

However, while ToA, TDOA, and RSRP measurements are readily available for indoor networks, the GPS locations are not available, either to the service provider's installers, or to the service providers' customers, who use the Location Based Service (LBS).

Thus, according to certain embodiments, Cellular-Ubiety ID measurements of customer defined locations may be performed. These measurements may include vectors of ToA[1 . . . N] and TDOA[1 . . . N] for each of an n-number of network node antennas capable of receiving signals from wireless device and may be linked to an ID. The measurements may also include vectors of RSRP[1 . . . N].

According to certain embodiments, Cellular-Ubiety ID measurements may be saved as fingerprints, either in their raw form, or in a processed form such as a calculated trilateration point. The Cellular-Ubiety Identifiers may be stored in tables in a Mobility Positioning Server (MPS).

Network node 115 then tracks all wireless devices 110, providing a continuous stream of ToA[ ], TDOA[ ], and RSRP[ ] vectors per wireless device 110 to the MPS, where vector data is compared against stored Cellular-Ubiety Identifier data. Comparisons which closely match, generally indicating an absolute difference of a few meters or less than 10 ns of error, between the UE streamed data, and the Cellular-Ubiety Identifier stored points, then triggers a message to be sent from the MPS indicating that a specific wireless device 110 is within a specified distance of a customer defined Universally Unique Identifier (UUID). Network node 115 then appears somewhat like a BlueTooth beacon locationing system, which uses UUIDs to uniquely identify the Beacon which wireless device 110 is near, as well as the proximity distance. However, the fundamentals of operation are completely different and quite unique.

The similarity between the actual identifying element, the ID of the Cellular-Ubiety ID, and the UUID used in BlueTooth is not by accident. While the UUID is used to uniquely identify a physical BlueTooth Beacon, the Cellular-Ubiety ID is used to uniquely identify a "whereness" location of interest only to the service providers' customers. These Cellular-Ubiety ID locations have no unique physical attribute apart from being defined as important by the service providers' customers.

A few examples may help to clarify this concept.

Figure 4:
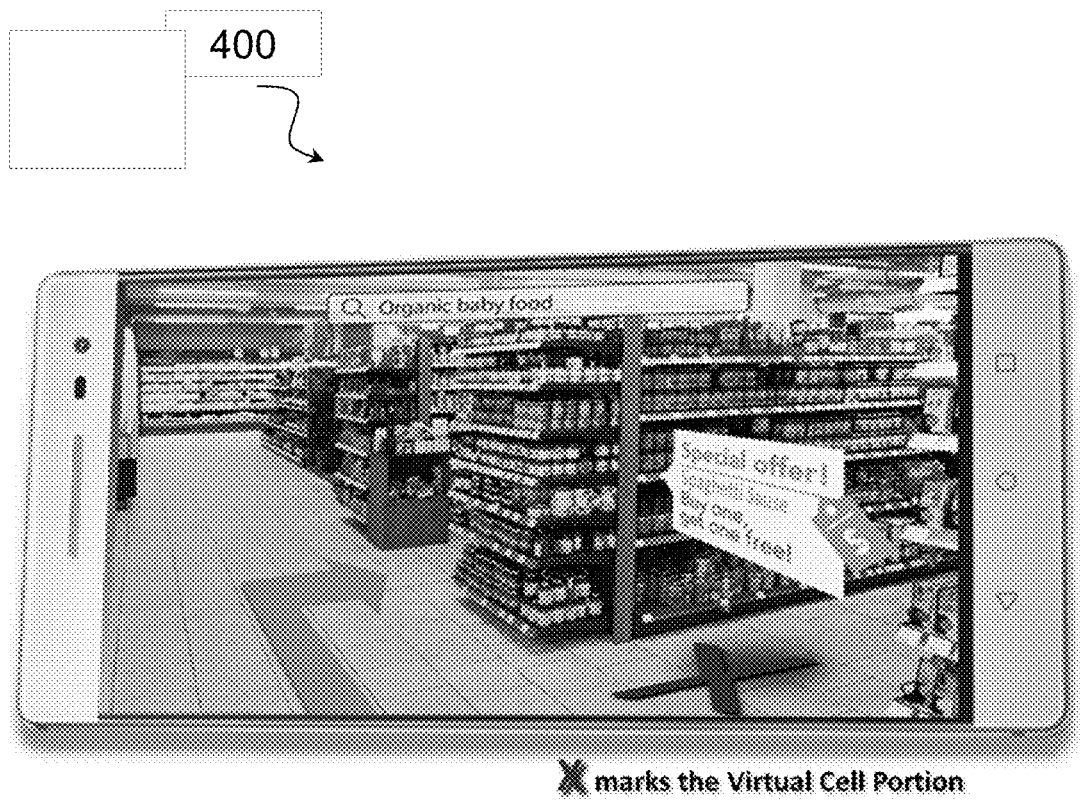
FIG. 4 illustrates an example graphical user interface (GUI) of a wireless device that is used to "mark" specialized locations, in accordance with certain embodiments.

In a first example, a store owner wishes to mark multiple locations in the store for this week's products specials. Accordingly, the manager may have his teenage employee walk around the store before opening hours and use his smart phone application to "mark" specialized locations within the store. FIG. 4 illustrates an example graphical user interface (GUI) 400 of a wireless device 110 that is used to "mark" specialized locations. In the illustrated example, the employee marks one location as shown with an "X." Unknown to the employee, the network node 115 records this location as a Cellular-Ubiety Identifier. The employee continues using the smart phone application to define and place an augmented reality banner, which states "Special offer! Spaghetti Sause. Buy one, get one free!" at the recorded location.

Apart from making a spelling mistake in this advertisement, the employee has, without his knowledge, created a Cellular-Ubiety ID. His only indication that this point is being recorded follows from the information which is uploaded to the network node.

According to certain embodiments, the employee may dynamically add or delete Cellular-Ubiety IDs throughout the store simply using the smart phone application. The smart phone application may include details about the store, such as:

- A user account number, which the application uses to manage the Cellular-Ubiety ID locations, and which is used to connect the Cellular-Ubiety ID points to the store name, location, and billing information,
- A map of the store floor, to allow the employee to mark the location of importance,
- An indication of the detection zone, such as 3 m, 5 m, or 10 m, or small, medium, and large.
- A Cellular-Ubiety ID marker description, such as an augmented reality image, with text description, or alternatively, an augmented reality video description, or simply an indication to the store owner of a customer's presence in the store, or near the store.

Figure 5:
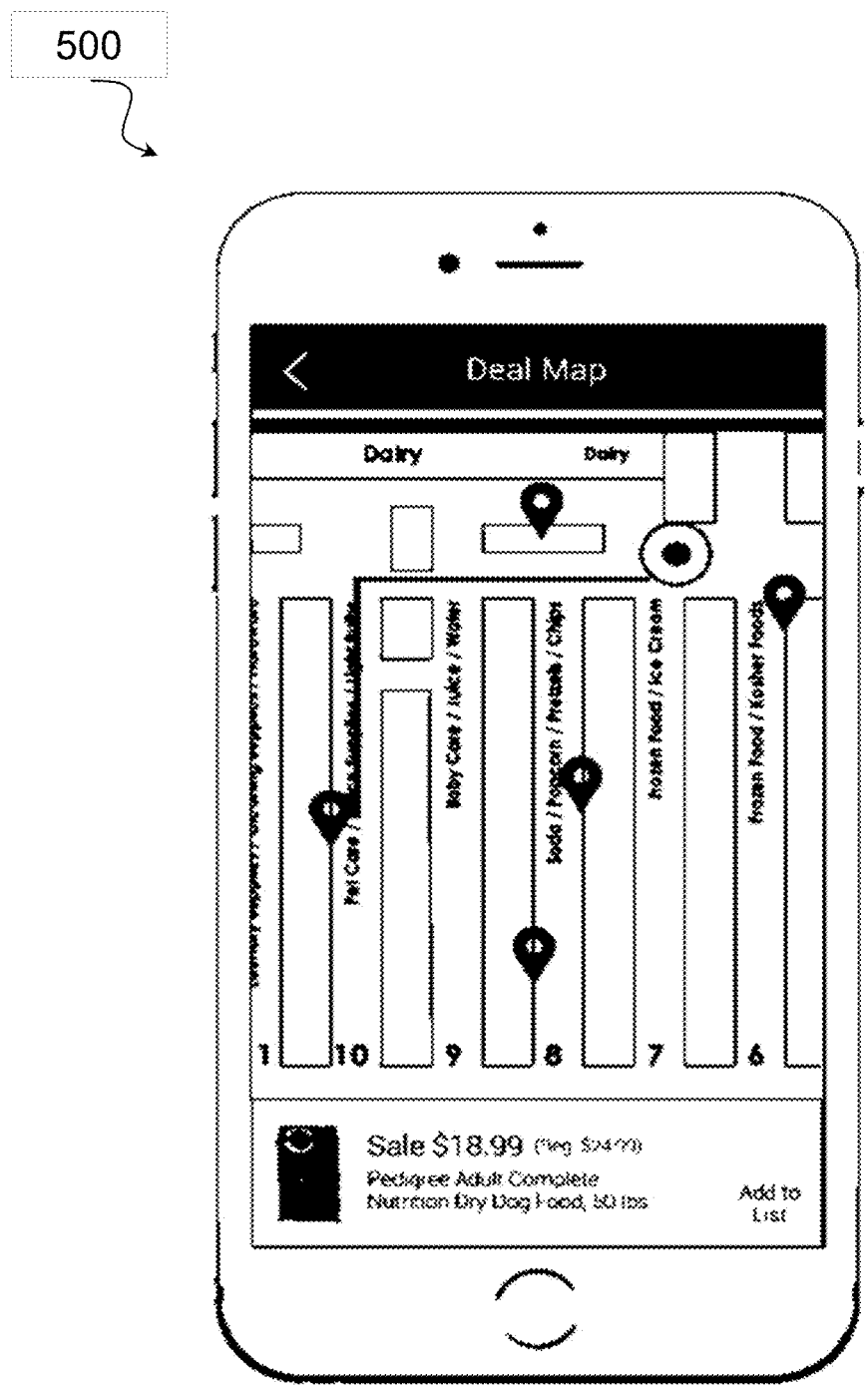
FIG. 5 illustrates an example graphical user interface depicting a map of five such points entered by the employee for the days' sales, in accordance with certain embodiments.

In this example, the store employee may create multiple Cellular-Ubiety ID entries as he prepares for the start of business. Each entry may be uniquely important to the store owner and may be defined with a unique Cellular-Ubiety ID. FIG. 5 illustrates an example graphical user interface 500 depicting a map of five such points entered by the employee for the days' sales.

Throughout this disclosure, the terms "identifier" and, more particular, Cellular Ubiety ID are used. The identifier and/or Cellular Ubiety ID may include any identifier that globally references the Cellular Ubiety location so that customers may reference their points of interest using internet databases without concerns over duplication or misinterpretation of identifiers. In order for a Cellular Ubiety customer defined locational system to achieve global acceptance, a universal identification must be employed. Fortunately, universally unique identification systems exist today.

Organizations such as the IEEE Registration Authority maintain a registry of media access control or MAC addresses, with an organizationally unique identifier or "OUI" assigned to interested parties. The IEEE assign 48-bit MAC addresses for Ethernet, 802.11, Bluetooth, and other (Token-Ring, FDDI, ATM, Fibre-Channel, SCSI, etc.) network interface to enable data communications. MAC-48 addresses are programmed in every device that connects to an IEEE 802 Ethernet or WiFi network.

The IEEE Registration Authority assign EUI-64 UIDs for FireWire (IEEE 1394), ZigBee, 802.15.4 and 6LoWPAN technologies for data communications. IPv6 uses EUI-64 UIDs as the least significant 64-bits of a unicast network address, or a link-local address.

The Bluetooth SIG organization has defined a 128 bit universally unique identifier or 'UUID' for Bluetooth devices which comply with the Bluetooth Specification and are compatible with a subset of Bluetooth profiles necessary to use desired services. An Assigned Numbers developer database lists assigned numbers, codes and identifiers in the Bluetooth wireless standard for a continuously updated range of profiles and services. Company identifiers are unique numbers assigned by the Bluetooth SIG to member companies to enable various services and profiles.

Other UUIDs or Globally Unique Identifiers GUIDs enable applications to generate identifiers, which for all practical purposes, are unique with a near zero probability of duplication.

UUIDs are, for all practical purposes, unique without depending for their uniqueness on a central registration authority or coordination between the parties generating them, unlike most other numbering schemes. While the probability that a UUID will be duplicated is not zero, it is so close to zero as to be negligible.

Generally, unique identifiers (UIDs) are a class of numbers, names, or codes which are guaranteed to be unique for a specific and defined purpose. There are three main types of UIDs, including serial numbers, assigned incrementally or sequentially; random numbers; and names or codes allocated by a central registry as discussed above by the IEEE Registration Authority, and the BlueTooth SIG organizations.

It is important to note that these organizations allocate UIDs to registered companies or entities for the application of enumerating/identifying network locations that is, "physical things" such as iBeacons, WiFi radios transceivers, or laptop Ethernet ports. In some cases, identifiers are allocated to manage virtual connections, such as WiFi radios operating as point to multi-point devices. However, even in these cases, the identifiers are traceable to a "physical thing" such as a transceiver.

However, according to certain embodiments described herein, a Cellular Ubiety ID has no physical thing to identify. Rather, Cellular Ubiety IDs represent locations of whereness and not physical elements. Thus, how will Cellular Ubiety IDs be implemented in our network solutions? These identifiers can be reported in multiple messages.

According to certain embodiments, the Cellular Ubiety IDs may be reported, for example, by an extension to an MLP Location Response messages.

Figure 6:
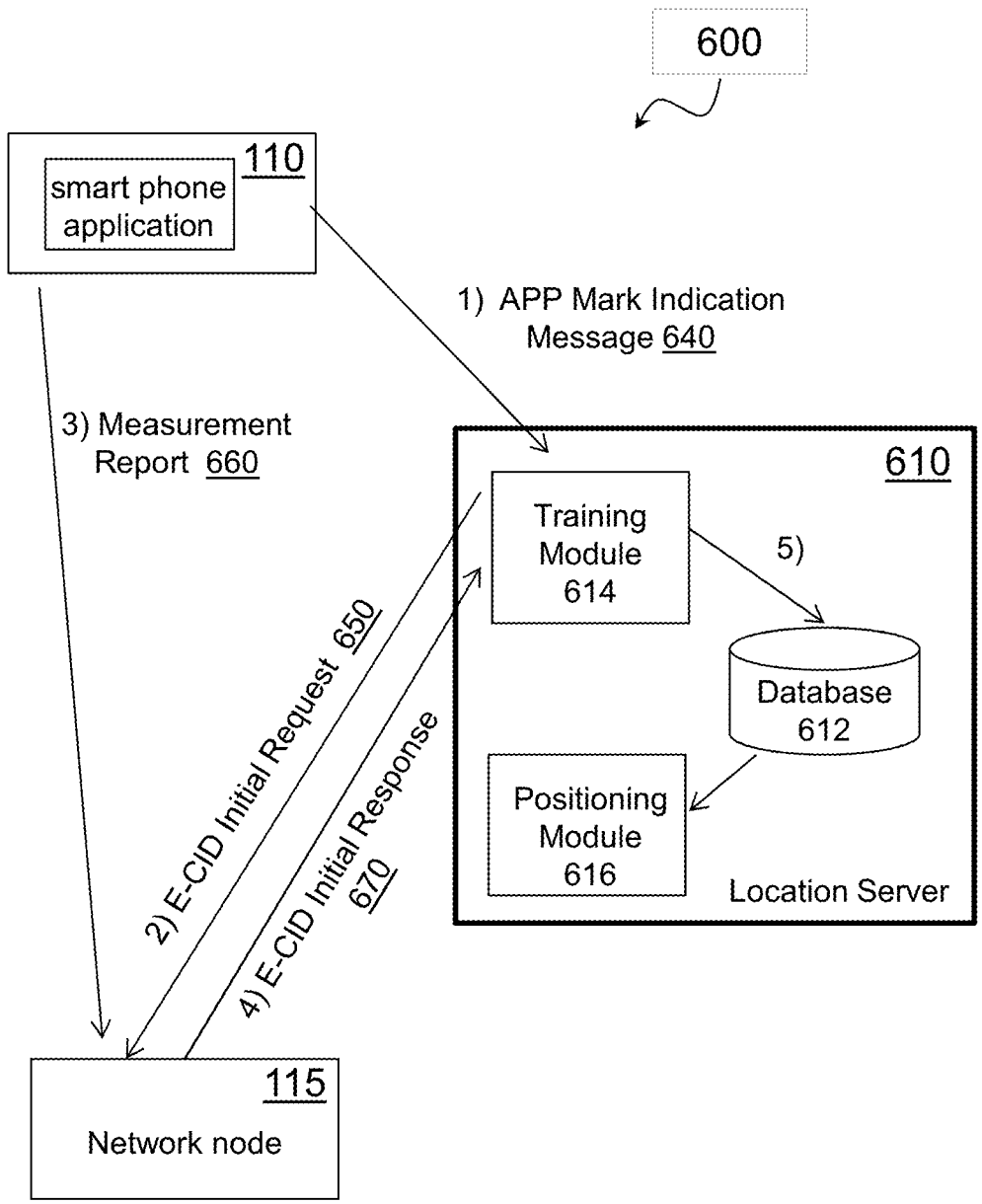
FIG. 6 illustrates an example locationing system and example messaging sequence during a training phase of locationing, in accordance with certain embodiments.

In the example described above, the process for creating and recording Cellular Ubiety IDs may be considered a "training phase." FIG. 6 illustrates an example locationing system 600 and example messaging sequence during a training phase of locationing, according to certain embodiments. Locationing system 600 includes a wireless device 110, a network node 115, and location server 610. As illustrated, a location server 610 includes a database 612, training module 614, and a positioning module 616. In a particular embodiment, location server 610 may be a part of or co-located with core network node 130. In another embodiment, location server 610 may be a part of or co-located with a network node 115.

In operation, and according to certain embodiments, the training phase may include:

1. As mentioned previously, during the training phase, the employee marks one location with the "X." The indication is transmitted from wireless device 110 to location server 610 as an App Mark Indication Message 640. Training module 614 in location server 610 may record it as a Cellular-Ubiety ID in database 612. Other information that the employee imports using the APP may also be sent to location server 610. For example, the employee may import a map of the store floor, an indication of the detection zone, and a Cellular-Ubiety ID marker description, such as an augmented reality image with text description.
2. Training module 614 sends the request message 650 to network node 115 to fetch measurement information. For example, in LTE, an LPPa E-CID initial procedure such as that defined in 3GPP 36.455 may be used to fetch measurement information.
3. Network node 115 fetches the measurement report 660 which is measured by wireless device 110. In certain embodiments, the measurement report 660 may include, for example, RSRP, RSRQ, and/or UE Time Difference of Arrival (TDOA). Simultaneously, network node 115 may also measure the UE signals. For example, network node 115 may measure the eNB UL received power and/or TDOA of UE transmissions in different eNodeB antennas.

4. Network node 115 sends, to location server 610, the measurement information 670, which was received from wireless device 110 and/or measured by network node 115. In a particular embodiment, the measurement information may be transmitted in an E-CID Initial Response message.

5. Training module 614 may then create or modify, in particular embodiments, a database entry associated with the Cellular-Ubiety ID. According to certain embodiments, the database entry may include all or some of the following information:

Cellular-Ubiety ID

A user account number, which the application uses to manage the Cellular-Ubiety ID locations, and which is used to connect the Cellular-Ubiety ID points to the store name, location, and billing information, A map of the store floor, to allow the employee to mark the location of importance, An indication of the detection zone, such as 3 m, 5 m, or 10 m, or small, medium, and large.

A Cellular-Ubiety ID marker description, such as an augmented reality image, with text description, or alternatively, an augmented reality video description, or simply an indication to the store owner of a customer's presence in the store, or near the store.

The information measured in wireless device 110

The cell Ids that are detected by the wireless device 110

Quantized power level information and signal-to-noise for signals received from the observable cells, performed by the wireless device 110

RSTD and Uncertainty of the RSTD, with respect to multiple cells, performed by the wireless device 110

The information measured in network node 115

Quantized power level information, signal-to-noise, measured on each antenna of the cell TDOA, measured on each antenna of the cell Angle of Arrive (AoA) for signals received from the UE 610, performed by the network node 115.

Figure 7:
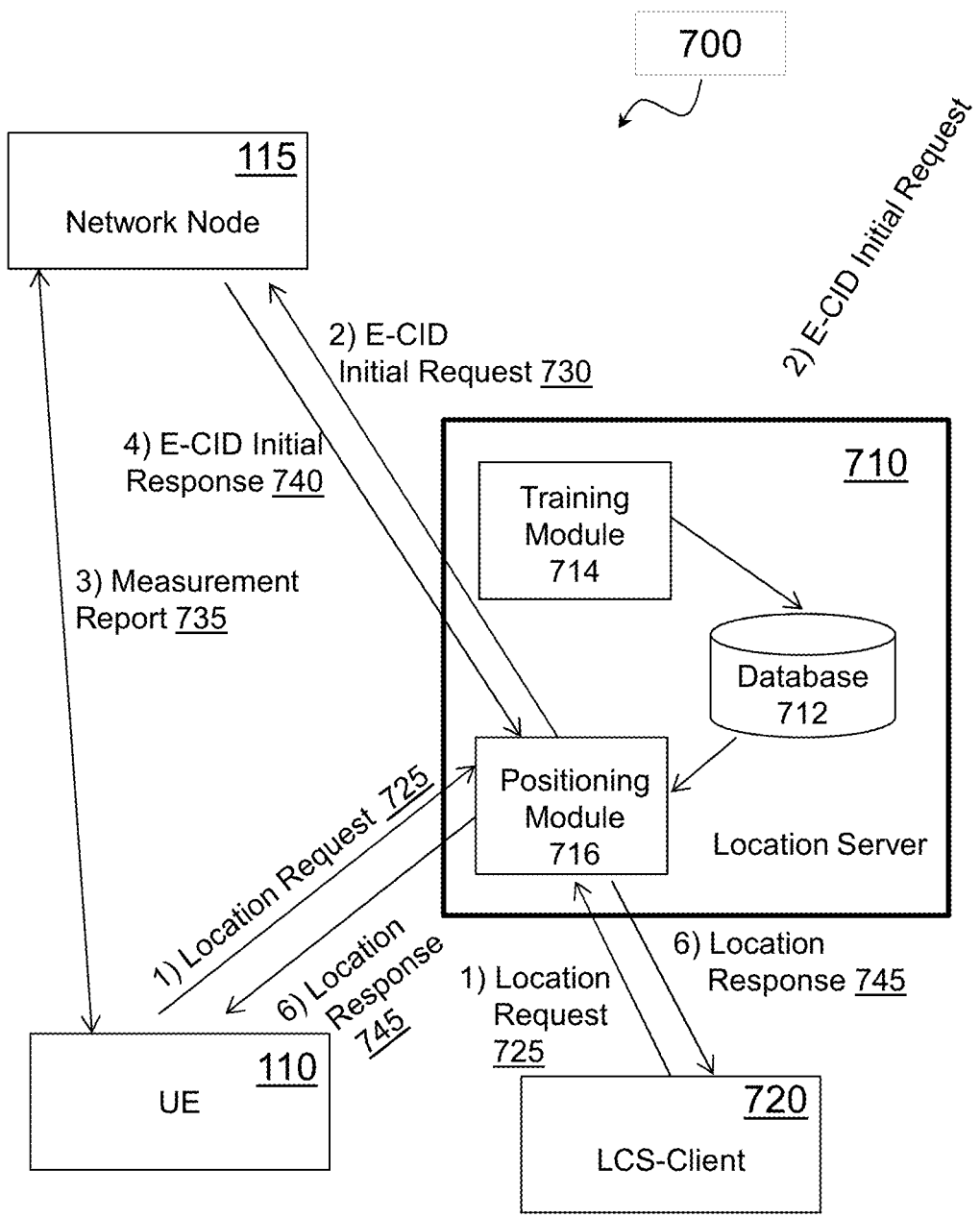
FIG. 7 illustrates the example positioning system and example messaging sequence during a positioning phase of locationing, in accordance with certain embodiments.

After the training phase is completed, a "positioning phase" may be used for determining a location of a wireless device. FIG. 7 illustrates the example positioning system 700 and example messaging sequence during a positioning phase of locationing, according to certain embodiments. Positioning system 700 includes a wireless device 110, a network node 115, a location server 710, and LCS client 720. Similar to FIG. 6, location server 710 includes a database 712, training module 714, and a positioning module 716. In a particular embodiment, location server 710 may be a part of or co-located with core network node 130. In another embodiment, location server 710 may be a part of or co-located with network node 115.

In operation, and according to certain embodiments, the positioning phase may include:

1) Positioning module 716 receives the Location request 725 from wireless device 110 or LCS-client 720.

2) Positioning module 716 sends measurement request message 730 to network node 115. In a particular embodiment, the request message 730 may include a E-CID initial request as defined for LTE.

3) Network node 115 fetches the measurements from wireless device 110. In a particular embodiment, network node 115 may request and receive a measurement report 735.

4) In a particular embodiment, network node 115 may also measure the signal sent by wireless device 110 and process measurement information received from wireless device 110. Network node 115 then sends the measured information 740 to location server 710, which may include information measured by both wireless device 110 and network node 115. In a particular embodiment, the measurement information 740 may be transmitted in an E-CID initial response message.

5) Positioning module 716 compares the received measurements with the reference signatures in the database 715. If a similar reference signature is found, it may be determined that wireless device 110 is near to a defined Cellular-Ubiety ID. Otherwise, if a similar reference signature is not found, it may be determined that the wireless device 110 is not near to any defined Cellular-Ubiety ID.

6) Positioning module 716 may then send the positioning result 745 to the wireless device 110 or the LCS-client 720 that requested the positioning information.

A more detailed explanation of the positioning procedure performed by positioning module 716 in step 5) above may now be described. As noted above, positioning module 716 compares the received measurements with the reference signatures stored in database 712. Based on the comparison, a similar reference signature may be found. According to various particular embodiments, Euclidean distance[1], or Mahalanobis distance or Kullback-leibler Divergence methods may be used to calculate the similarity or probability between the received measurements and the stored reference signatures. Euclidean distance is discussed by Paul Kemppi and Sami Nousianen in "Database Correlation Method for Multi-System Positioning," Vehicular Technology Conference, 2006. VTC 2006-Spring. IEEE 63rd. Mahalanobis distance is discussed by R. De Maesschalck, D. Jouan-Rimbaud, and D. Massart, in "The Mahalanobis distance", Chemometrics and Intelligent Laboratory Systems 50:1-18, 2000. Kullback-leibler Divergence is also discussed by D. Milioris in "Low-dimensional signal-strength fingerprint-based positioning in wireless LANs," Ad Hoc Networks, 2012, doi:10.1016/j.adhoc.2011.12.006.

As an example, a detailed solution for computing the probability based on Euclidean distance is provided:

P(s1, s2, . . . , sn; td1, td2, . . . , tdm|CUBID) is the probability that the received signal strength is s1, s2, . . . , sn and TDOA is td1, td2, . . . , tdm when a person/UE is approximate to the Cellular-Ubiety ID point.

We assume the received signal strength s1, s2, . . . , sn is uncorrelated, td1, td2, . . . , tdm is uncorrelated so:

P(s1, s2, . . . , sn; td1, td2, . . . , tdm|CUBID)=P(s1|CUBID)*P(s2| CUBID)* . . . *P(sn| CUBID)*P(td1|CUBID)*P(td2|CUBID)* . . . *P(tdm|CUBID);

Assume the received signal strength follows Gaussian distribution in the CUBID:

$$P(s1 \mid CUBID) = \frac{1}{\sqrt{2\pi}\,\sigma 1} e^{-\frac{(s1-\mu 1)^2}{\sigma 1^2}}$$

Where:

$\mu 1$ is the expectation of the received signal strength on cell1, which can be found in the database of reference signature, and σ1² is the variance of the received signal strength, which can be found in the database of fingerprint training signature.

Then P(td1|CUBID), P(td2|CUBID), ..., P(tdm|CUBID) can be computed in the same way. So we can get P(s1, s2, ..., sn; td1, td2, ..., tdm|CUBID).

Finally, compare the $$\sqrt[n+m]{P(s1, s2, \ldots, sn; td1, td2, \ldots, tdm \mid CUBID)}$$

with defined constant, 3MThreshold, and 5MThershold, to check if the UE is within the scope.

For example:

if $$\sqrt[n+m]{P(s1, s2, \ldots, sn; td1, td2, \ldots, tdm \mid CUBID)} > 3M\ Threshold,$$

the UE is within 3 meters of CUBID, and if $$\sqrt[n+m]{P(s1, s2, \ldots, sn; td1, td2, \ldots, tdm \mid CUBID)} > 5M\ Threshold,$$

the UE is within 5 meters of CUBID.

Figure 8:
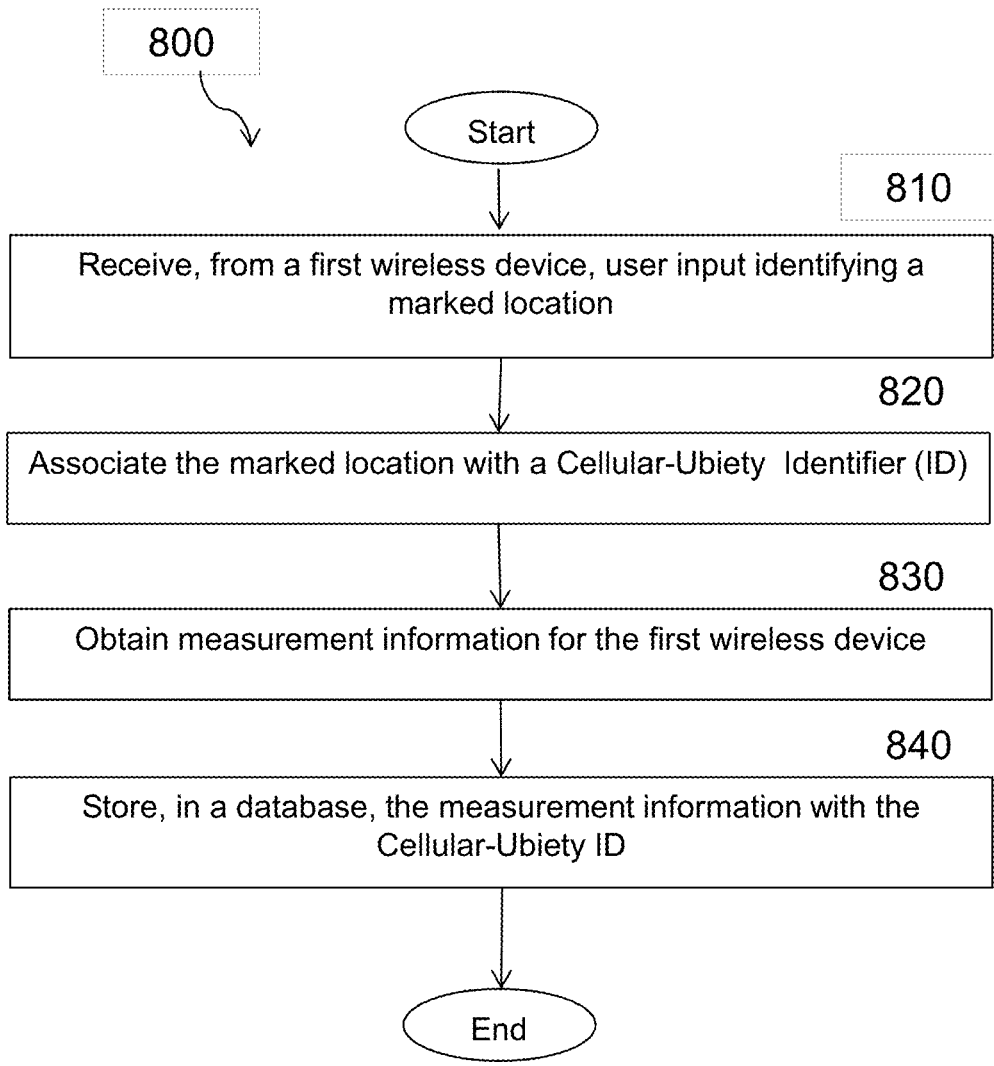
FIG. 8 illustrates an example method by a radio node operating as a location server, in accordance with certain embodiments.

FIG. 8 illustrates an example method 800 by a radio node operating as a location server, according to certain embodiments. In particular embodiments, the radio node 115 may be a part of or co-located with network node 115, core network node 130, or any other radio node that may function as a location server. In a particular embodiment, the radio node includes a core network node. In another embodiment, the radio node may include an eNodeB or gNodeB.

The method begins at step 810 when, during a training phase, the radio node 115 receives, from a first wireless device 110, user input identifying a marked location. In a particular embodiment, the user input may be received from a UE application running on the first wireless device 110.

At step 820, radio node 115 associates the marked location with a Cellular-Ubiety Identifier (ID). In a particular embodiment, the Cellular-Ubiety ID may be a blue tooth device address. In other embodiments, the Cellular-Ubiety ID may include any one or more of a Bluetooth Public Device Address (BT-DPA), an iBeacon UUID, an Android Beacon Identifier, a MAC address, a Version 1 UUID that includes a date-time and a MAC address, a Version 2 UUID that includes a Distributed Computing Environment (DCE) Security version, DCE security version UUID, a Version 3 or Version 5 UUID that includes a name-based identifier, a Version 4 UUID that includes a random identifier, a uniquely identifiable alphanumeric assignment, and a random hash value that has a unique identity.

At step 830, radio node 115 obtains measurement information for the first wireless device 110. In a particular embodiment, radio node 115 may transmit a request for the measurement information to the first wireless device and, in response to the request, receive the measurement information from the first wireless device 110. According to various particular embodiments, the measurement information may include at least one of
one or more cell identifiers detected by the wireless device;
quantized power level information and signal-to-noise measurements for signals received from one or more cells detected by the wireless device;
Reference Signal Receive Power (RSRP) for signals received from the one or more cells detected by the wireless device;
Reference Signal Receive Quality (RSRQ) for signals received from the one or more cells detected by the wireless device; and
Time Difference of Arrival (TDOA) with respect to a plurality of cells as measured by the wireless device.

In a particular embodiment, the radio node 115 may obtain the measurement information by transmitting a request for the measurement information to a network node providing communication services to the first wireless device and, in response to the request, receiving the measurement information from the network node. A first portion of the measurement information may be measured by the network node 115 and may include at least one of:
quantized power level information and signal-to-noise information as measured on each of a plurality of antennas of the network node 115;
Time Difference of Arrival (TDOA) as measured on each of the plurality of antennas of the network node 115; and
an Angle of Arrive (AoA) for each of signal received from the first wireless device by the network node 115.

In a particular embodiment, the radio node may obtain the measurement information for the first wireless device 115 by performing a measurement procedure on at least one signal received from the first wireless device 110 to directly obtain a first portion of the measurement information. The first portion of the measurement information may include at least one of:
quantized power level information and signal-to-noise information as measured on each of a plurality of antennas of the network node;
Time Difference of Arrival (TDOA) as measured on each of the plurality of antennas of the network node; and
an Angle of Arrive (AoA) for each of signal received from the first wireless device by the network node.

In a particular embodiment, a second portion of the measurement information may be measured by the first wireless device 110. The second portion of the measurement information may include at least one of:
one or more cell identifiers detected by the first wireless device;
quantized power level information and signal-to-noise measurements for signals received from one or more cells detected by the first wireless device;
Reference Signal Receive Power (RSRP) for signals received from the one or more cells detected by the first wireless device;
Reference Signal Receive Quality (RSRQ) for signals received from the one or more cells detected by the first wireless device; and
Time Difference of Arrival (TDOA) with respect to a plurality of cells as measured by the first wireless device.

At step 840, radio node 115 stores, in a database, the measurement information with the Cellular-Ubiety ID. In a particular embodiment, radio node 115 may transmit a message to the first wireless device 110 that indicates that the marked location has been stored.

In a particular embodiment, the method may include receiving additional information from the wireless device and associating and storing the additional information with the Cellular-Ubiety ID. For example, radio node 115 may receive a map of an area associated with the marked location that may be associated with the measurement information and the Cellular-Ubiety ID. As another example, radio node 115 may receive an indication of a detection zone that may be associated with the measurement information and the Cellular-Ubiety ID. As still another example, radio node 115 may receive a marker description that may be associated with the measurement information and the Cellular-Ubiety ID. In a particular embodiment, the marker description may include an augmented reality image, an augmented reality video, and/or a text description.

According to particular embodiments, the method may also include associating, by the radio node 115, the Cellular-Ubiety ID associated and the measurement information with at least one of a user account number, a user name, a user location, and billing information.

According to a particular embodiment, the method may further include, developing, by the radio node 115, a set of key performance indicators, which may include at least one of:
- a number of Ubiety point detections,
- a number of Ubiety point detections verses proximity,
- an average time spent by the first wireless device within a proximity distance of the marked location associated with the Cellular-Ubiety ID,
- a minimum wireless device velocity within a proximity distance of the marked location associated with the Cellular-Ubiety ID,
- total time spent by the first wireless device within a proximity distance of the marked location associated with the Cellular-Ubiety ID, and
- total time spent by the wireless device within a tracking range of the cellular system.

Certain embodiments may comprise more or fewer actions, and the actions may be performed in any suitable order.

Figure 9:
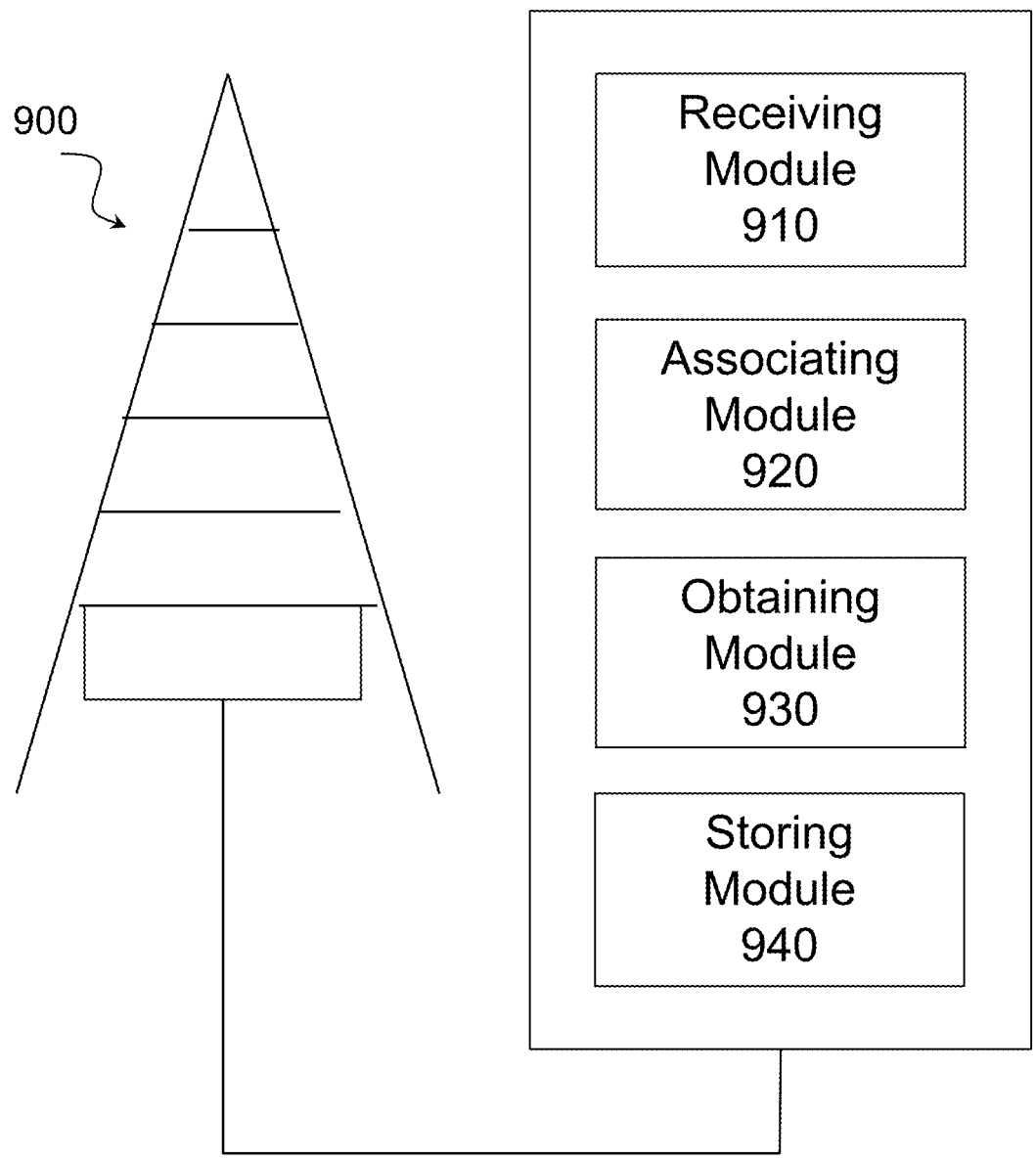
FIG. 9 illustrates an example virtual computing device, in accordance with certain embodiments.

In certain embodiments, the method by a radio node operating as a location server may be performed by a virtual computing device. FIG. 9 illustrates an example virtual computing device 900, according to certain embodiments. In certain embodiments, virtual computing device 900 may include modules for performing steps similar to those described above with regard to the method illustrated and described in FIG. 8. For example, virtual computing device 900 may include a receiving module 910, an associating module 920, an obtaining module 930, a storing module 940, and any other suitable modules for operating as a location server. In some embodiments, one or more of the modules may be implemented using processing circuitry 320 of FIG. 3. In certain embodiments, the functions of two or more of the various modules may be combined into a single module.

The receiving module 910 may perform certain of the receiving functions of virtual computing device 900. For example, in a particular embodiment, receiving module 910 may receive, from a wireless device 110, user input identifying a marked location.

The associating module 920 may perform certain of the associating functions of virtual computing device 900. For example, in a particular embodiment, associating module 920 may associate the marked location with a Cellular-Ubiety ID.

The obtaining module 930 may perform certain of the obtaining functions of virtual computing device 900. For example, in a particular embodiment, obtaining module 930 may obtain measurement information for the first wireless device 110.

The storing module 940 may perform certain of the storing functions of virtual computing device 900. For example, in a particular embodiment, storing module 940 may store the measurement information with the Cellular-Ubiety ID in a database.

Other embodiments of virtual computing device 900 may include additional components beyond those shown in FIG. 9 that may be responsible for providing certain aspects of the radio node's functionality, including any of the functionality described above and/or any additional functionality (including any functionality necessary to support the solutions described above). The various different types of radio nodes may include components having the same physical hardware but configured (e.g., via programming) to support different radio access technologies, or may represent partly or entirely different physical components.

Figure 10:
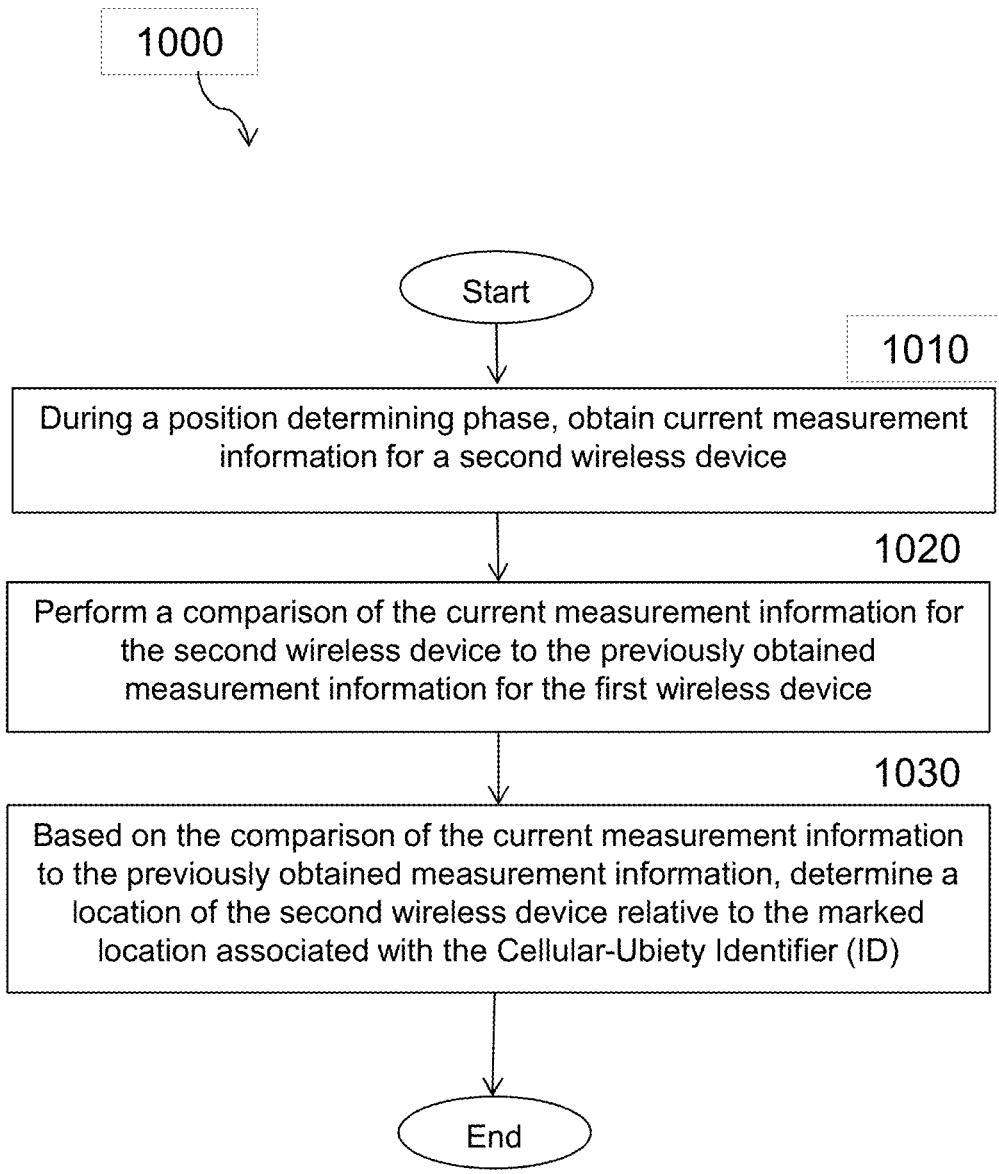
FIG. 10 illustrates another example method by a radio node operating as a location server, in accordance with certain embodiments.

FIG. 10 illustrates an example method 1000 by a radio node operating as a location server, according to certain embodiments. In particular embodiments, the radio node 115 may be a part of or co-located with network node 115, core network node 130, or any other radio node that may function as a location server. In a particular embodiment, the radio node may include an eNodeB or gNodeB.

The method begins at step 1010 when, during a position determining phase that occurs at some point in time after the training phase described with regard to FIG. 8, the radio node 115 obtains current measurement information for a second wireless device 110. According to certain embodiments, the second wireless device 110 includes a wireless device other than the first wireless device 110 described with regard to FIG. 8.

At step 1020, the radio node performs a comparison of the current measurement information for the second wireless device 110 to previously obtained measurement information. In a particular embodiment, the previously obtained measurement information may comprise measurement information obtained for the first wireless device 110 as described with regard to FIG. 8.

In a particular embodiment, performing the comparison may include determining a measure of similarity between the current measurement information for the second wireless device 110 and the measurement information for the first wireless device 110.

At step 1030, and based on the comparison of the current measurement information to the previously obtained measurement information, the radio node 115 determines a location of the second wireless device 110 relative to a marked location associated with a Cellular-Ubiety ID associated with the previously obtained measurement information at step 1030.

In a particular embodiment, determining the location of the second wireless device 110 may include determining that the second wireless device 110 is proximate to the marked location associated with the Cellular-Ubiety ID when a measure of similarity is less than or equal to a particular threshold. Alternatively, it may be determined that the second wireless device 110 is not proximate to the marked location associated with the Cellular-Ubiety ID when the measure of similarity is greater than a particular threshold. For example, the measure of similarity may be measured based on an Euclidean distance, a Mahalanobis distance, or Kullbakc-leibler Divergence techniques.

In a particular embodiment, a plurality of thresholds may be associated with the Cellular-Ubiety ID and the particular threshold may be selected based on a detection zone associated with the measurement information for the marked location associated with the Cellular-Ubiety ID.

In a particular embodiment, the location of second wireless device 110 may be determined to be within a detection zone of the marked location, and the method may further include transmitting a message. The message may include an indication of the location of the second wireless device within the detection zone of the marked location, the Cellular-Ubiety ID, and/or a distance indication comprising a distance between the second wireless device and the marked location associated with the Cellular-Ubiety ID.

In a particular embodiment, the method may further include receiving, from the second wireless device 110, a request for the location information for the second wireless device 110 and transmitting, to the second wireless device 110, a location information response. The location information response may include any one or combination of an indication of a location of the wireless device relative to the marked location associated with the Cellular-Ubiety ID and a relative Euclidean distance to the marked location associated with the Cellular-Ubiety ID.

Certain embodiments may comprise more or fewer actions, and the actions may be performed in any suitable order.

Figure 11:
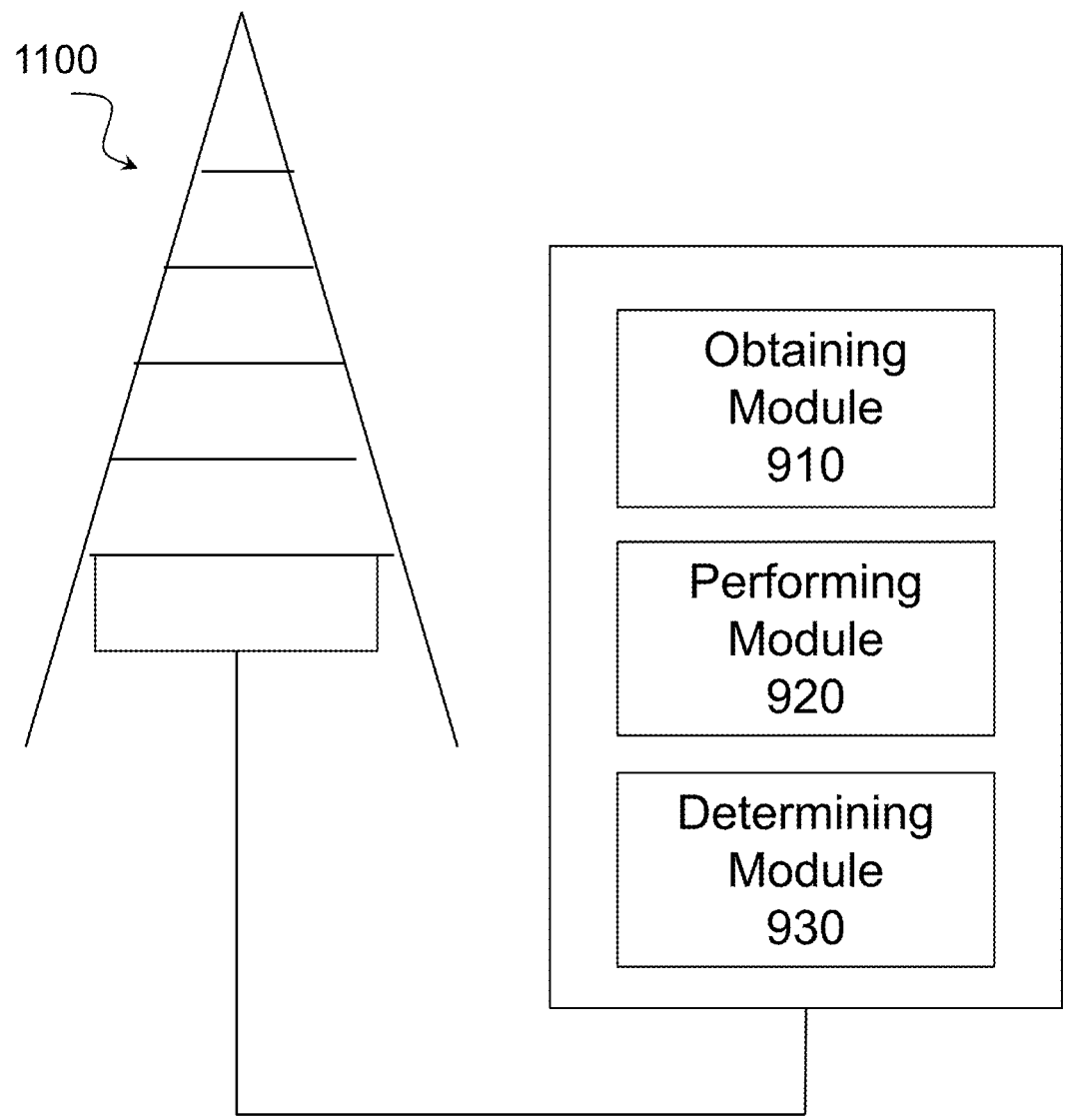
FIG. 11 illustrates another example virtual computing device, according to certain embodiments.

In certain embodiments, the method by a radio node operating as a location server may be performed by a virtual computing device. FIG. 11 illustrates an example virtual computing device 1100, according to certain embodiments. In certain embodiments, virtual computing device 1100 may include modules for performing steps similar to those described above with regard to the method illustrated and described in FIG. 10. For example, virtual computing device 900 may include an obtaining module 1110, a performing module 1120, a determining module 1130, and any other suitable modules for locationing. In some embodiments, one or more of the modules may be implemented using processing circuitry 320 of FIG. 3. In certain embodiments, the functions of two or more of the various modules may be combined into a single module.

The obtaining module 1110 may perform certain of the obtaining functions of virtual computing device 1100. For example, in a particular embodiment, obtaining module 1110 may obtain current measurement information for a second wireless device 110.

The performing module 1120 may perform certain of the performing functions of virtual computing device 1100. For example, in a particular embodiment, performing module 1120 may perform a comparison of the current measurement information for the wireless device to previously obtained measurement information The determining module 1130 may perform certain of the determining functions of virtual computing device 1100. For example, in a particular embodiment, determining module 1130 may determine, based on the comparison of the current measurement information to the previously obtained measurement information for a first wireless device 110, a location of the second wireless device 110 relative to a marked location associated with a Cellular-Ubiety ID associated with the previously obtained measurement information.

Other embodiments of virtual computing device 1100 may include additional components beyond those shown in FIG. 11 that may be responsible for providing certain aspects of the radio node's functionality, including any of the functionality described above and/or any additional functionality (including any functionality necessary to support the solutions described above). The various different types of radio nodes may include components having the same physical hardware but configured (e.g., via programming) to support different radio access technologies, or may represent partly or entirely different physical components.

Figure 12:
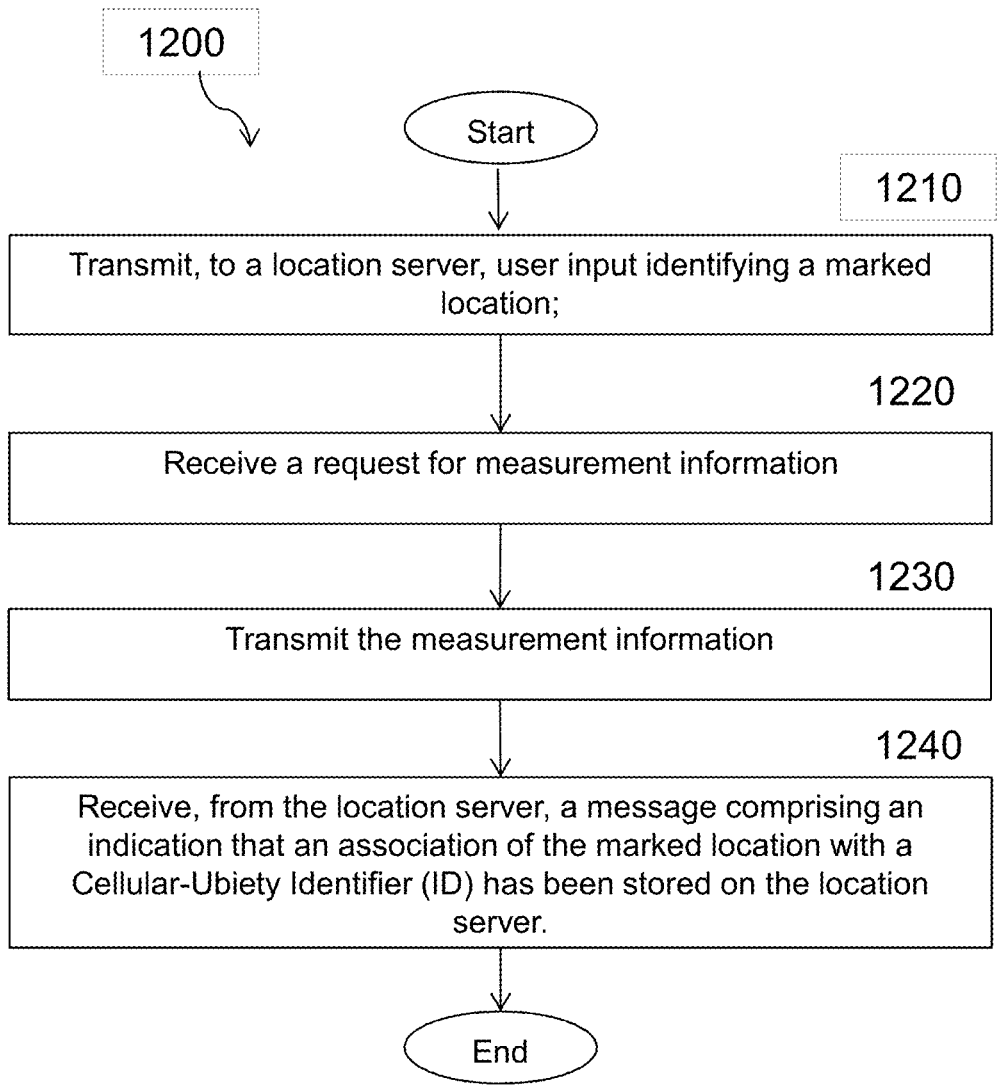
FIG. 12 illustrates an example method by a first wireless device for marking a location, in accordance with certain embodiments.

FIG. 12 illustrates an example method 1200 by a first wireless device 110 for marking a location, according to certain embodiments. The method begins at step 1210 when, during a training phase, the first wireless device 110 transmits user input identifying a marked location to a location server. In a particular embodiment, the user input may be transmitted using a UE application running on the first wireless device 110. In a particular embodiment, the UE application may include a map of an area associated with the marked location, which may be transmitted to the location server to be associated with the marked location and subsequently assigned Cellular-Ubiety ID.

In a particular embodiment, first wireless device 110 may also transmit, to the location server or another network node in communication with the location server, one or more of the following to also be associated with the marked location and the subsequently assigned Cellular-Ubiety ID:
  an indication of a detection zone to be associated with the marked location and the Cellular-Ubiety ID;
  a marker description that may include at least one of an augmented reality image, an augmented reality video, and/or a text description;
  a user account number;
  a user name;
  a user location; and
  billing information.

At step 1220, the first wireless device 110 receives a request for current measurement information. In a particular embodiment, the request for the measurement information is received from the location server. In another embodiment, the request for the measurement information may be received from a network node in communication with the location server.

In a particular embodiment, the measurement information includes at least one of:
  one or more cell identifiers detected by the wireless device;
  quantized power level information and signal-to-noise measurements for signals received from one or more cells detected by the wireless device;
  Reference Signal Receive Power (RSRP) for signals received from the one or more cells detected by the wireless device;
  Reference Signal Receive Quality (RSRQ) for signals received from the one or more cells detected by the wireless device; and
  Time Difference of Arrival (TDOA) with respect to a plurality of cells as measured by the wireless device.

At step 1230, the first wireless device 110 transmits the measurement information. In a particular embodiment, the measurement information may be transmitted to the location server. In another embodiment, the measurement information may be transmitted to a network node in communication with the location server.

At step 1240, the first wireless device 110 receives, from the location server, a message that includes an indication that an association of the marked location with a Cellular-Ubiety ID has been stored by the location server. According to various particular embodiments, the Cellular-Ubiety ID may include one or more of the following:
  a Bluetooth device address;
  a Bluetooth Public Device Address (BT-PDA);
  an iBeacon UUID;
  an Android Beacon Identifier;
  a MAC address;

a Version 1 UUID that comprises a date-time and a MAC Address;
a Version 2 UUID that comprises a DCE Security version;
a DCE security version UUID;
a Version 3 or 5 UUID that comprises a name-based identifier;
a Version 4 UUID that comprises a random identifier;
a uniquely identifiable alphanumeric assignment; and
a random hash value that has a unique identity.

Certain embodiments may comprise more or fewer actions, and the actions may be performed in any suitable order.

Figure 13:
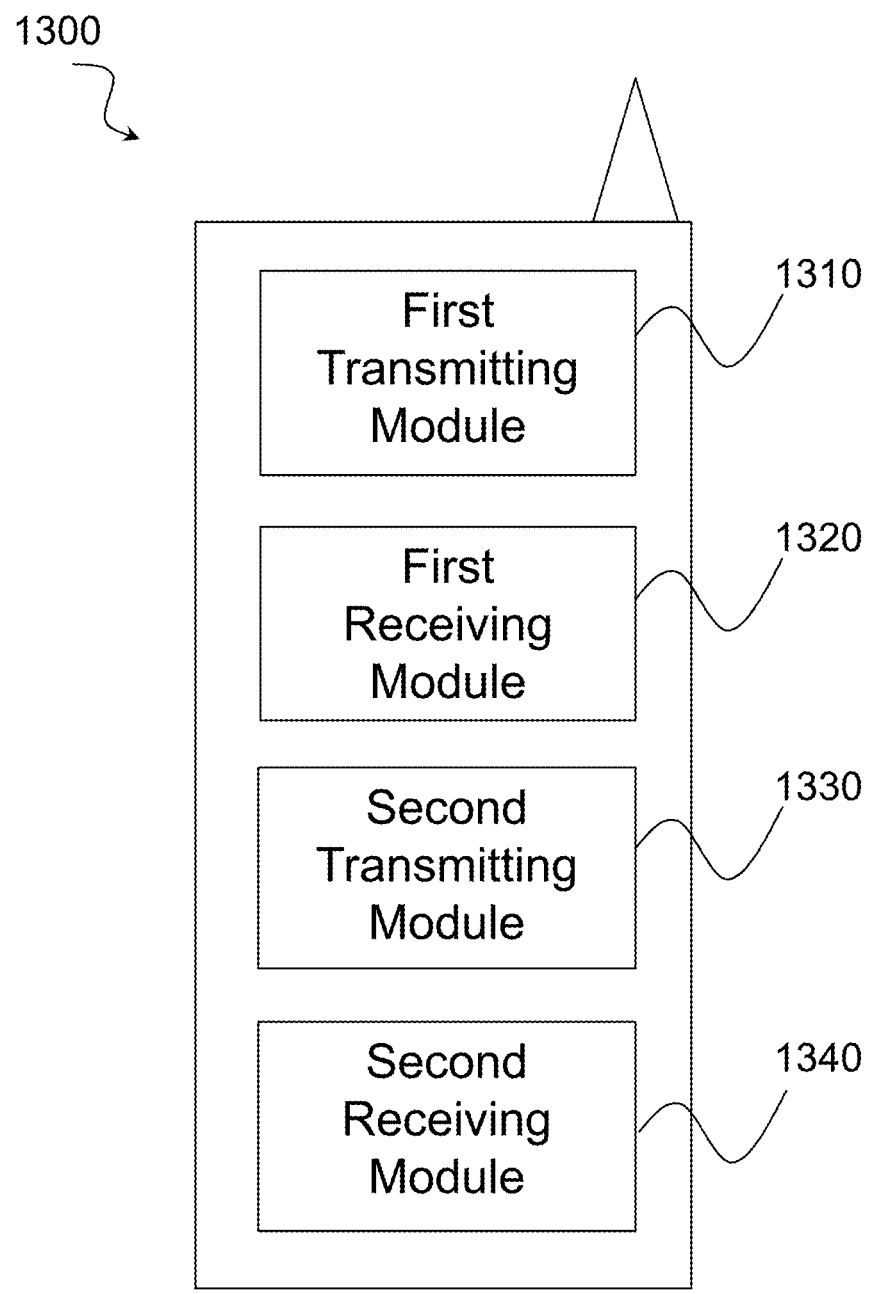
FIG. 13 illustrates an example virtual computing device for marking a location, in accordance with certain embodiments.

In certain embodiments, the method for identifying a marked location may be performed by a virtual computing device. FIG. 13 illustrates an example virtual computing device 1300 for identifying a marked location, according to certain embodiments. In certain embodiments, virtual computing device 1300 may include modules for performing steps similar to those described above with regard to the method illustrated and described in FIG. 12. For example, virtual computing device 1300 may include a first transmitting module 1310, a first receiving module 1320, a second transmitting module 1330, a second receiving module 1340, and any other suitable modules for identifying a marked location. In some embodiments, one or more of the modules may be implemented using processing circuitry 220 of FIG. 2. In certain embodiments, the functions of two or more of the various modules may be combined into a single module.

The first transmitting module 1310 may perform certain of the transmitting functions of virtual computing device 1300. For example, in a particular embodiment, first transmitting module 1310 may transmit, to a location server, user input identifying a marked location.

The first receiving module 1320 may perform certain of the receiving functions of virtual computing device 1100. For example, in a particular embodiment, first receiving module 1320 may receive a request for measurement information.

The second transmitting module 1330 may perform certain of the transmitting functions of virtual computing device 1300. For example, in a particular embodiment, transmitting module 1330 may transmit the measurement information.

The second receiving module 1340 may perform certain of the receiving functions of virtual computing device 1300. For example, in a particular embodiment, receiving module 1340 may receive, from the location server, a message that indicates that an association of the marked location with a Cellular-Ubiety ID has been stored by the location server.

Other embodiments of virtual computing device 1300 may include additional components beyond those shown in FIG. 13 that may be responsible for providing certain aspects of the wireless device's functionality, including any of the functionality described above and/or any additional functionality (including any functionality necessary to support the solutions described above). The various different types of wireless devices may include components having the same physical hardware but configured (e.g., via programming) to support different radio access technologies, or may represent partly or entirely different physical components.

Figure 14:
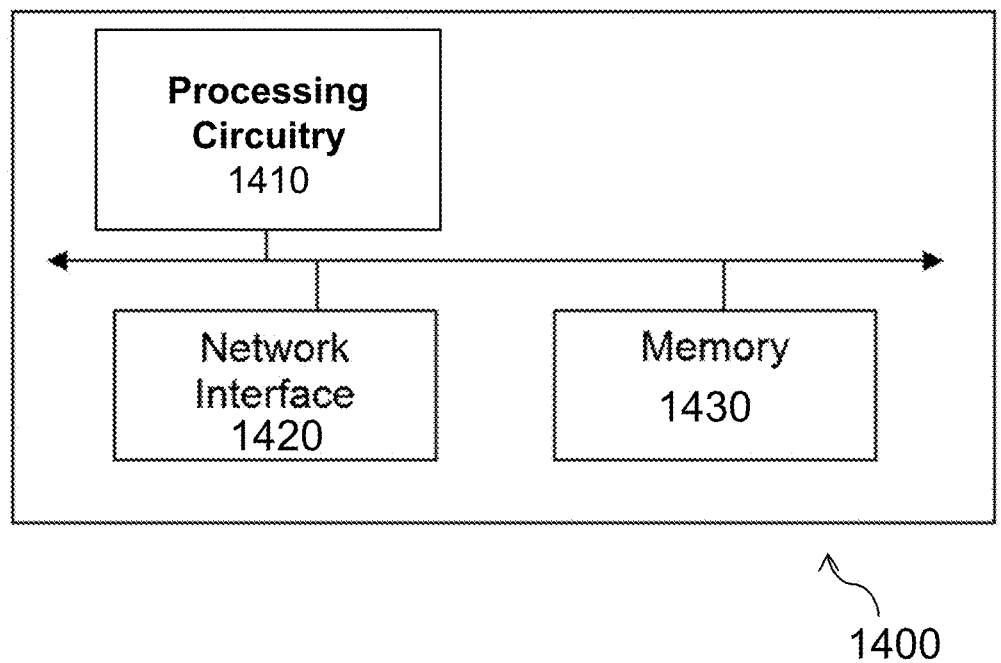
FIG. 14 illustrates an example radio network controller or core network node 1400, in accordance with certain embodiments.

FIG. 14 illustrates an example radio network controller or core network node 1400, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node includes processing circuitry 1410 (e.g., which may include one or more processors), network interface 1420, and memory 1430. In some embodiments, processing circuitry 1410 executes instructions to provide some or all of the functionality described above as being provided by the radio network controller or core network node, memory 1430 stores the instructions executed by processing circuitry 1410, and network interface 1420 communicates signals to any suitable node, such as a gateway, switch, router, Internet, Public Switched Telephone Network (PSTN), network nodes 115, radio network controllers or core network nodes, etc.

Processing circuitry 1410 may include any suitable combination of hardware and software implemented in one or more modules to execute instructions and manipulate data to perform some or all of the described functions of the radio network controller or core network node. According to certain embodiments, for example, processing circuitry 1410 may receive, during a training phase, user input identifying a marked location from a first wireless device 110, associate the marked location with a Cellular-Ubiety ID, obtain measurement information for the first wireless device 110, and store the measurement information with the Cellular-Ubiety ID. Additionally or alternatively, processing circuitry 1410 may obtain, during a position determining phase that occurs after the training phase, current measurement information for a second wireless device 110, perform a comparison of the current measurement information for the second wireless device 110 to previously obtained measurement information for a first wireless device 110, and, based on the comparison of the current measurement information to the previously obtained measurement information, determine a location of the second wireless device 110 relative to a marked location associated with a Cellular-Ubiety Identifier (ID) associated with the previously obtained measurement information associated with the first wireless device 110. In some embodiments, processing circuitry 1410 may include, for example, one or more computers, one or more central processing units (CPUs), one or more microprocessors, one or more applications, and/or other logic.

Memory 1430 is generally operable to store instructions, such as a computer program, software, an application including one or more of logic, rules, algorithms, code, tables, etc. and/or other instructions capable of being executed by a processor. Examples of memory 1430 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1420 is communicatively coupled to processing circuitry 1410 and may refer to any suitable device operable to receive input for the network node, send output from the network node, perform suitable processing of the input or output or both, communicate to other devices, or any combination of the preceding. Network interface 1420 may include appropriate hardware (e.g., port, modem, network interface card, etc.) and software, including protocol conversion and data processing capabilities, to communicate through a network.

Other embodiments of the network node may include additional components beyond those shown in FIG. 14 that may be responsible for providing certain aspects of the network node's functionality, including any of the functionality described above and/or any additional functionality (including any functionality necessary to support the solution described above).

Figure 15:
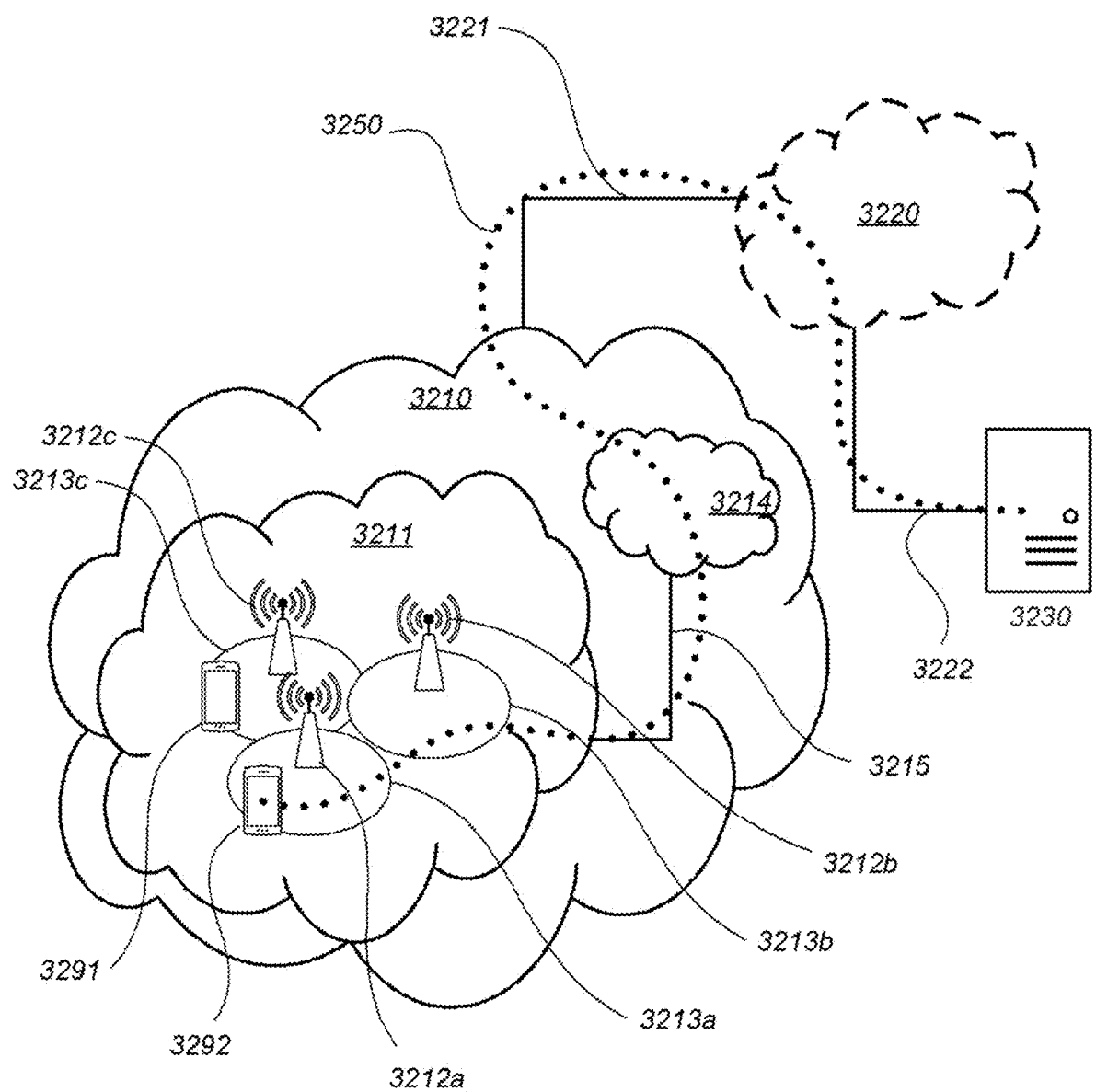
FIG. 15 illustrates a telecommunication network connected via an intermediate network to a host computer, in accordance with certain embodiments.

FIG. 15 schematically illustrates a telecommunication network connected via an intermediate network to a host computer, according to certain embodiments. In accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 15 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Figure 16:
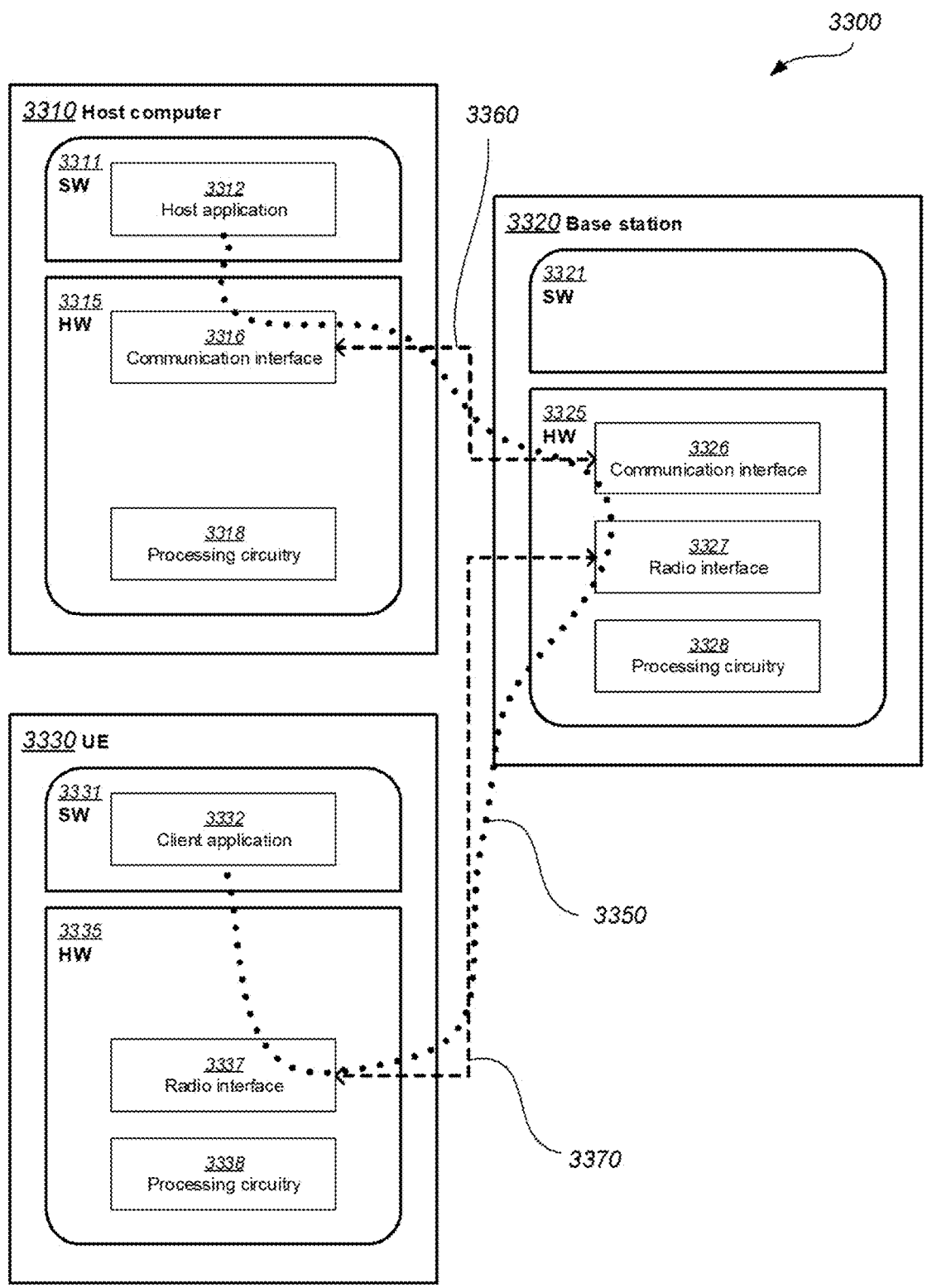
FIG. 16 illustrates a host computer communicating via a base station with a user equipment over a partially wireless connection, in accordance with certain embodiments.

FIG. 16 is a generalized block diagram of a host computer communicating via a base station with a user equipment over a partially wireless connection, according to certain embodiments. Example implementations, in accordance with an embodiment, of the UE, base station and host computer discussed in the preceding paragraphs will now be described with reference to FIG. 16. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 16) served by the base station 3320. The communication interface 3326 may be configured to facilitate a connection 3360 to the host computer 3310. The connection 3360 may be direct or it may pass through a core network (not shown in FIG. 16) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

It is noted that the host computer 3310, base station 3320 and UE 3330 illustrated in FIG. 16 may be identical to the host computer 3230, one of the base stations 3212a, 3212b, 3212c and one of the UEs 3291, 3292 of FIG. 15, respectively. This is to say, the inner workings of these entities may be as shown in FIG. 16 and independently, the surrounding network topology may be that of FIG. 15.

In FIG. 16, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the data rate, and/or latency and thereby provide benefits such as reduced user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figures 17, 18:
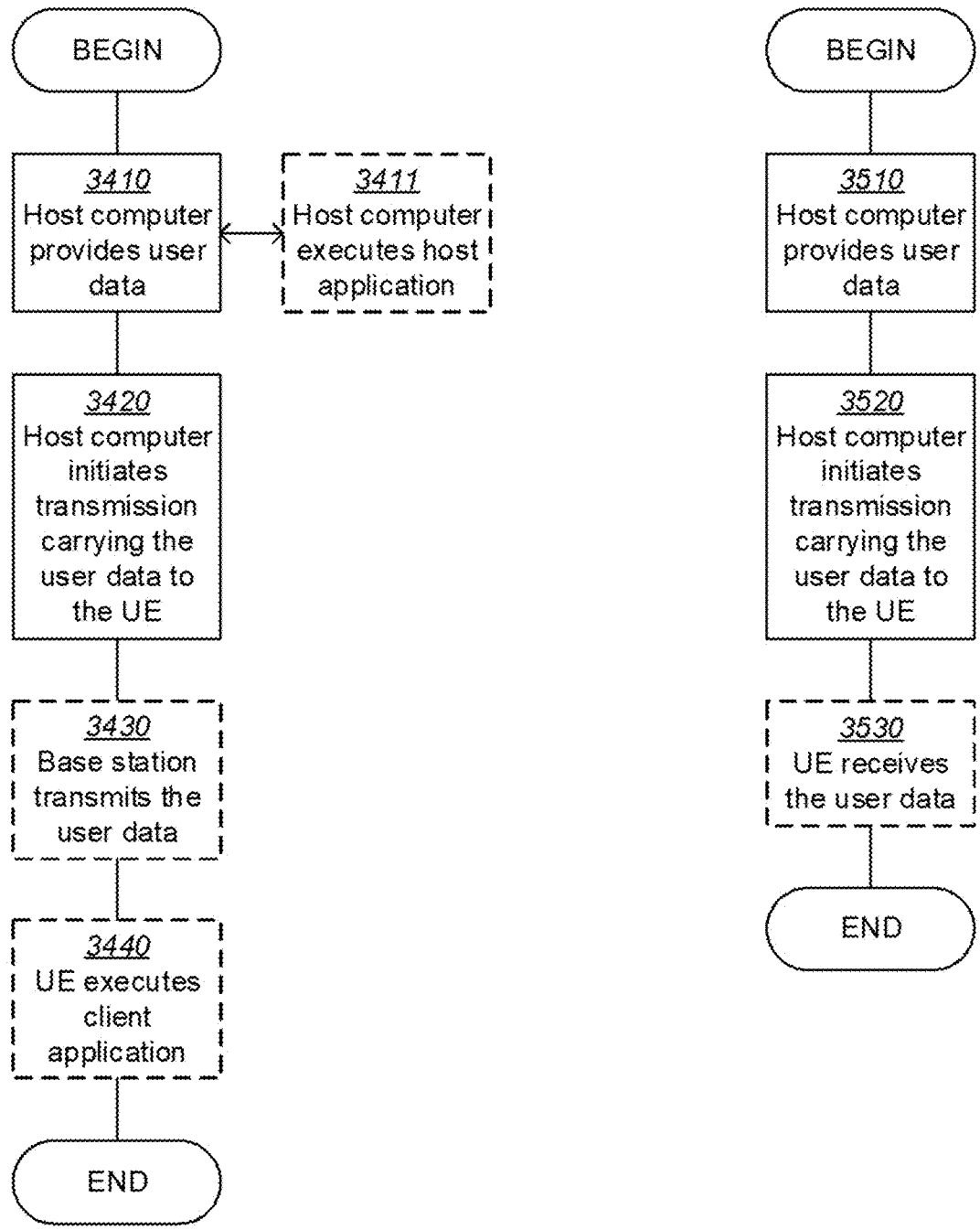
FIG. 17 illustrates a method implemented in a communication system, in accordance with certain embodiments.
FIG. 18 illustrates a method implemented in a communication system, in accordance with certain embodiments.

FIG. 17 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 17 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 18 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 18 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figures 19, 20:
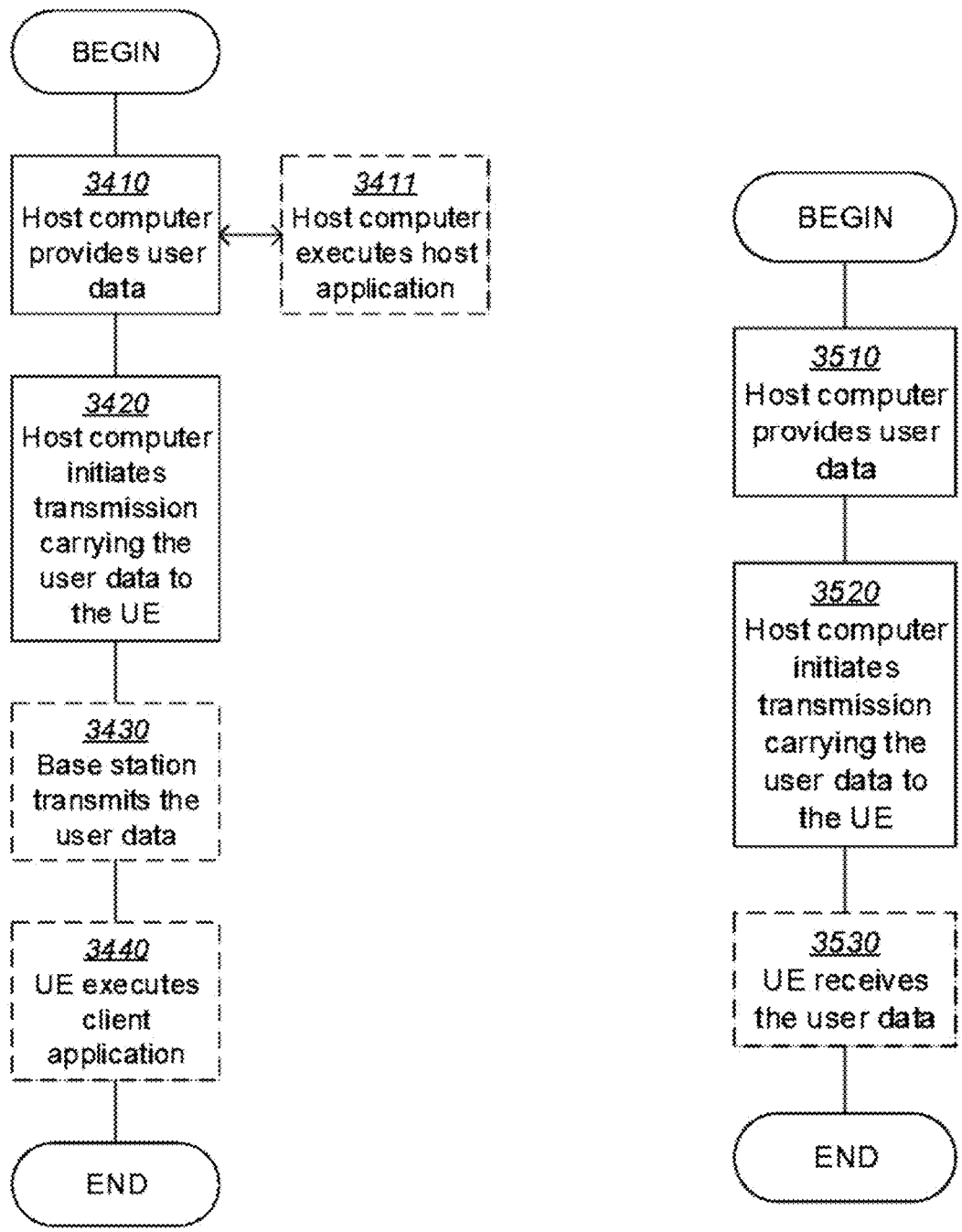
FIG. 19 illustrates a method implemented in a communication system, in accordance with certain embodiments.
FIG. 20 illustrates a method implemented in a communication system, in accordance with one embodiment.

FIG. 19 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 19 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 20 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 20 will be included in this section. In an optional first step 3710 of the method, in accordance with the teachings of the embodiments described throughout this disclosure, the base station receives user data from the UE. In an optional second step

3720, the base station initiates transmission of the received user data to the host computer. In a third step 3730, the host computer receives the user data carried in the transmission initiated by the base station.

ABBREVIATIONS

| Abbreviation | Explanation |
|---|---|
| 5G | Fifth generation radio |
| BLE | Bluetooth Low Energy |
| Cell Portion | A geographical portion of a cell covered by a single antenna beam |
| DL | Downlink |
| DU | Digital Unit |
| E911 | Enhanced 911, used for mobile technology |
| E-CID | Enhanced Cell ID |
| eNB | Enhanced Node B |
| GPS | Global Positioning System |
| iBeacon | Apple terminology for their 802.15 BLE beacon product |
| KPI | Key Performance Index |
| LBS | Location Based Services |
| LPPa | LTE Positioning Protocol A |
| LTE | Long Term Evolution |
| RSRP | Reference Signal Received Power |
| RSSI | Received Signal Strength Indication |
| ToA | Time-of-Arrival |
| UE | User Equipment, such as a cell phone |
| UL | Uplink |
| WCDMA | Wideband Code Division Multiple Access |

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

The invention claimed is:

1. A method by a radio node operating as a location server, the method comprising:
   receiving, from a first wireless device, user input identifying a marked location;
   associating the marked location with a Cellular-Ubiety Identifier (ID);
   obtaining measurement information for the first wireless device;
   storing, in a database, the measurement information with the Cellular-Ubiety ID;
   obtaining current measurement information for a second wireless device;
   performing a comparison of the current measurement information for the second wireless device to the measurement information for the first wireless device; and
   based on the comparison of the current measurement information for the second wireless device to the measurement information for the first wireless device, determining a location of the second wireless device relative to the marked location associated with the Cellular-Ubiety ID.

2. The method of claim 1, wherein:
   obtaining the measurement information for the first wireless device comprises:
   transmitting a request for the measurement information to the first wireless device; and
   in response to the request, receiving the measurement information from the first wireless device, and
   the measurement information received from the first wireless device comprises at least one of:
   one or more cell identifiers detected by the wireless device;
   quantized power level information and signal-to-noise measurements for signals received from one or more cells detected by the wireless device;
   Reference Signal Receive Power (RSRP) for signals received from the one or more cells detected by the wireless device;
   Reference Signal Receive Quality (RSRQ) for signals received from the one or more cells detected by the wireless device; and
   Time Difference of Arrival (TDOA) with respect to a plurality of cells as measured by the wireless device.

3. The method of claim 1, wherein:
   obtaining the measurement information for the first wireless device comprises:
   transmitting a request for the measurement information to a network node providing communication services to the first wireless device; and
   in response to the request, receiving the measurement information from the network node, and
   a first portion of the measurement information is measured by the network node, the first portion of the measurement information comprising at least one of:
   quantized power level information and signal-to-noise information as measured on each of a plurality of antennas of the network node;
   Time Difference of Arrival (TDOA) as measured on each of the plurality of antennas of the network node; and
   an Angle of Arrive (AoA) for each of signal received from the first wireless device by the network node.

4. The method of claim 1, wherein:
   obtaining the measurement information for the first wireless device comprises performing, by the radio node, a measurement procedure on at least one signal received from the first wireless device to directly obtain a first portion of the measurement information, and
   the first portion of the measurement information comprises at least one of:
   quantized power level information and signal-to-noise information as measured on each of a plurality of antennas of the network node;

Time Difference of Arrival (TDOA) as measured on each of the plurality of antennas of the network node; and
an Angle of Arrive (AoA) for each of signal received from the first wireless device by the network node.

5. The method of claim 3, wherein a second portion of the measurement information is measured by the first wireless device, the second portion of the measurement information comprising at least one of:
one or more cell identifiers detected by the first wireless device;
quantized power level information and signal-to-noise measurements for signals received from one or more cells detected by the first wireless device;
Reference Signal Receive Power (RSRP) for signals received from the one or more cells detected by the first wireless device;
Reference Signal Receive Quality (RSRQ) for signals received from the one or more cells detected by the first wireless device; and
Time Difference of Arrival (TDOA) with respect to a plurality of cells as measured by the first wireless device.

6. The method of claim 1, further comprising:
receiving information comprising at least one of:
a map of an area associated with the marked location;
an indication of a detection zone;
a marker description associated with the marked location, the marker description comprising at least one of an augmented reality image, an augmented reality video and a text description;
associating the information with the measurement information and the Cellular-Ubiety ID.

7. The method of claim 1, further comprising:
in response to determining that the location of the second wireless device is within a detection zone of the marked location, transmitting a message comprising at least one of:
an indication of the location of the second wireless device within the detection zone of the marked location;
the Cellular-Ubiety ID;
a distance indication comprising a distance between the second wireless device and the marked location associated with the Cellular-Ubiety ID;
a relative Euclidean distance to the marked location associated with the Cellular-Ubiety ID.

8. The method of claim 1, wherein the Cellular-Ubiety ID is a universally unique identifier (UUID) comprising at least one of:
a bluetooth device address;
a Bluetooth Public Device Address (BT-PDA);
an iBeacon UUID;
an Android Beacon Identifier;
a MAC address;
a Version 1 UUID that comprises a date-time and a MAC Address;
a Version 2 UUID that comprises a Distributed Computing Environment (DCE) Security version;
a DCE security version UUID;
a Version 3 or Version 5 UUID that comprises a name-based identifier;
a Version 4 UUID that comprises a random identifier;
a uniquely identifiable alphanumeric assignment; and
a random hash value that has a unique identity.

9. The method of claim 1, wherein the radio node comprises a core network node, an eNodeB, or a gNodeB.

10. A radio node operating as a location server, the radio node comprising:
memory, storing instructions; and
processing circuitry configured to execute the instructions to cause the radio node to:
receive, from a first wireless device, user input identifying a marked location;
associate the marked location with the Cellular-Ubiety Identifier (ID);
obtain measurement information for the first wireless device;
store, in a database, the measurement information with the Cellular-Ubiety ID;
obtaining current measurement information for a second wireless device;
performing a comparison of the current measurement information for the second wireless device to the measurement information for the first wireless device; and
based on the comparison of the current measurement information for the second wireless device to the measurement information for the first wireless device, determining a location of the second wireless device relative to the marked location associated with the Cellular-Ubiety.

11. The radio node of claim 10, wherein:
when obtaining the measurement information for the first wireless device, the processing circuitry is operable to execute the instructions to cause the radio node to:
transmit a request for the measurement information to a network node providing communication services to the first wireless device; and
in response to the request, receive the measurement information from the network node; and
the measurement information received from the first wireless device comprises at least one of:
one or more cell identifiers detected by the wireless device;
quantized power level information and signal-to-noise measurements for signals received from one or more cells detected by the wireless device;
Reference Signal Receive Power (RSRP) for signals received from the one or more cells detected by the wireless device;
Reference Signal Receive Quality (RSRQ) for signals received from the one or more cells detected by the wireless device; and
Time Difference of Arrival (TDOA) with respect to a plurality of cells as measured by the wireless device.

12. The radio node of claim 10, wherein:
when obtaining the measurement information for the first wireless device, the processing circuitry is operable to execute the instructions to cause the radio node to:
transmit a request for the measurement information to a network node providing communication services to the first wireless device; and
in response to the request, receive the measurement information from the network node, and
a first portion of the measurement information is measured by the network node, the first portion of the measurement information comprising at least one of:
quantized power level information and signal-to-noise information as measured on each of a plurality of antennas of the network node;
Time Difference of Arrival (TDOA) as measured on each of the plurality of antennas of the network node; and an Angle of Arrive (AoA) for each of signal received from the first wireless device by the network node.

13. The radio node of claim 10, wherein:
when obtaining the measurement information for the first wireless device, the processing circuitry is operable to execute the instructions to cause the radio node to perform a measurement procedure on at least one signal received from the first wireless device to directly obtain a first portion of the measurement information, and the first portion of the measurement information comprises at least one of:
quantized power level information and signal-to-noise information as measured on each of a plurality of antennas of the network node;
Time Difference of Arrival (TDOA) as measured on each of the plurality of antennas of the network node; and
an Angle of Arrive (AoA) for each of signal received from the first wireless device by the network node.

14. The radio node of claim 12, wherein a second portion of the measurement information is measured by the first wireless device, the second portion of the measurement information comprising at least one of:
one or more cell identifiers detected by the first wireless device;
quantized power level information and signal-to-noise measurements for signals received from one or more cells detected by the first wireless device;
Reference Signal Receive Power (RSRP) for signals received from the one or more cells detected by the first wireless device;
Reference Signal Receive Quality (RSRQ) for signals received from the one or more cells detected by the first wireless device; and
Time Difference of Arrival (TDOA) with respect to a plurality of cells as measured by the first wireless device.

15. The radio node of claim 10, wherein the processing circuitry is operable to execute the instructions to cause the radio node to:
receive information comprising at least one of:
a map of an area associated with the marked location;
an indication of a detection zone;
a marker description associated with the marked location, the marker description comprising at least one of an augmented reality image, an augmented reality video, and a text description;
associate the information with the measurement information and the Cellular-Ubiety ID.

16. The radio node of claim 10, wherein the processing circuitry is operable to execute the instructions to cause the radio node to:
in response to determining that the location of the second wireless device is within a detection zone of the marked location, transmit a message comprising at least one of:
an indication of the location of the second wireless device within the detection zone of the marked location;
the Cellular-Ubiety ID;
a distance indication comprising a distance between the second wireless device and the marked location associated with the Cellular-Ubiety ID; and
a relative Euclidean distance to the marked location associated with the Cellular-Ubiety ID.

17. The radio node of claim 10, wherein the radio node comprises a core network node, an eNodeB, or a gNodeB.

* * * * *